United States Patent
Gremmelspacher et al.

(10) Patent No.: US 11,939,253 B2
(45) Date of Patent: Mar. 26, 2024

(54) METHOD FOR SHAPING GLASS PANES

(71) Applicant: Fraunhofer-Gesellschaft zur Förderung der angewandten Forschung e.V., Munich (DE)

(72) Inventors: Matthias Gremmelspacher, Freiburg (DE); Tobias Rist, Freiburg (DE); Peter Gumbsch, Freiburg (DE); Rainer Kubler, Freiburg (DE); Adrian Baab, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/250,505

(22) PCT Filed: Jul. 31, 2019

(86) PCT No.: PCT/EP2019/070638
§ 371 (c)(1),
(2) Date: Jan. 29, 2021

(87) PCT Pub. No.: WO2020/025678
PCT Pub. Date: Feb. 6, 2020

(65) Prior Publication Data
US 2021/0309557 A1    Oct. 7, 2021

(30) Foreign Application Priority Data
Jul. 31, 2018    (DE) ............ 10 2018 212 796.4

(51) Int. Cl.
*C03B 23/025*    (2006.01)
*B32B 17/06*    (2006.01)
*B32B 17/10*    (2006.01)

(52) U.S. Cl.
CPC ......... *C03B 23/0256* (2013.01); *B32B 17/06* (2013.01); *B32B 17/10036* (2013.01);
(Continued)

(58) Field of Classification Search
CPC ............ C03B 23/0256; C03B 23/0258; C03B 23/0235; B32B 17/06; B32B 17/10036;
(Continued)

(56) References Cited

U.S. PATENT DOCUMENTS

| | | | |
|---|---|---|---|
| 5,176,733 A | 1/1993 | Koss | |
| 5,322,539 A * | 6/1994 | Mathisen | C03B 23/0258 220/678 |

(Continued)

FOREIGN PATENT DOCUMENTS

| | | |
|---|---|---|
| CN | 1496966 A | 5/2004 |
| CN | 103930382 A | 7/2014 |

(Continued)

OTHER PUBLICATIONS

Macnica, Macnica Displays LCD display solutions for OEMs, https://macnicadisplays.com/?gclid=EAlaIQobChMlsqyG7M TV9wIVAq7ICh0mZATSEAAYASAAEgL8dPD_BwE, accessed May 10, 2022 (Year: 2021).*

(Continued)

*Primary Examiner* — S. Behrooz Ghorishi
(74) *Attorney, Agent, or Firm* — Schwegman Lundberg & Woessner, P.A.

(57) ABSTRACT

The invention relates to a method for shaping a glass pane (1), wherein the glass pane (1) is first heated and then bent until it has reached a shape that corresponds to a predefined target contour (ks), wherein exterior forces act on the glass pane (1) for the purpose of bending the glass pane (1). A change in a local curvature of the glass pane (1) over time is controlled such that the surface of the glass pane (1)

(Continued)

simultaneously achieves the target contour at all points of the surface that do not remain static, by setting a temperature, and thus a viscosity, of the glass pane (1) so as not to be constant as a function of the location during the bending operation, and/or by suitably setting forces transferred by mounts (6) and/or pressure forces transferred by one or more pressure strips (3). The application furthermore relates to multiple glazed units produced by the method.

13 Claims, 10 Drawing Sheets

(52) U.S. Cl.
CPC .. *B32B 17/10128* (2013.01); *B32B 17/10871* (2013.01); *B32B 17/10889* (2013.01); *C03B 23/0258* (2013.01); *B32B 2315/08* (2013.01); *B32B 2419/00* (2013.01); *B32B 2605/006* (2013.01); *B32B 2605/08* (2013.01)

(58) Field of Classification Search
CPC ........ B32B 17/10128; B32B 17/10871; B32B 17/10889; B32B 2315/08; B32B 2419/00; B32B 2605/006; B32B 2605/08
See application file for complete search history.

(56) References Cited

U.S. PATENT DOCUMENTS

| | | | |
|---|---|---|---|
| 2003/0154746 A1 | 8/2003 | Lammi et al. | |
| 2008/0134721 A1 | 6/2008 | Maeda | |
| 2012/0114901 A1 | 5/2012 | Uraji et al. | |
| 2013/0086948 A1* | 4/2013 | Bisson | C03B 23/0258 65/273 |
| 2016/0031737 A1* | 2/2016 | Hoppe | C03B 23/0235 65/102 |
| 2018/0207923 A1* | 7/2018 | Lampman | B32B 17/10119 |

FOREIGN PATENT DOCUMENTS

| | | |
|---|---|---|
| CN | 105314826 A | 2/2016 |
| DE | 2503467 A1 | 8/1975 |
| DE | 102007012146 A1 | 9/2008 |
| DE | 102011050628 A1 | 11/2012 |
| DE | 102013106641 A1 | 1/2015 |
| DE | 102014110920 A1 | 2/2016 |
| FR | 412231 A | 7/1910 |
| JP | 60141651 | 7/1985 |
| JP | 11199254 A | 7/1999 |
| JP | 2004502631 | 1/2004 |
| JP | 2005067928 A | 3/2005 |
| JP | 2008532906 | 8/2008 |
| JP | 2015501274 | 1/2015 |
| KR | 20170123592 A | 11/2017 |
| WO | WO-2005042420 A1 | 5/2005 |
| WO | WO-2014141790 A1 | 9/2014 |
| WO | 2016143328 | 9/2016 |

OTHER PUBLICATIONS

"German Application Serial No. 10 2018 212 796.4, Office Action dated Feb. 21, 2019", (dated Feb. 21, 2019), 7 pgs.

"International Application Serial No. PCT/EP2019/070638, International Search Report dated Oct. 17, 2019", (dated Oct. 17, 2019), 3 pgs.

"International Application Serial No. PCT/EP2019/070638, Written Opinion dated Oct. 17, 2019", (dated Oct. 17, 2019), 7 pgs.

"Chinese Application Serial No. 201980051007.7, Office Action dated Jul. 27, 2022", w/ English Translation, (Jul. 27, 2022), 17 pgs.

"Japanese Application Serial No. 2021-501342, Office Action dated May 9, 2023", w English Translation, (May 9, 2023), 20 pgs.

"Japanese Application Serial No. 2021-501342, Office Action dated Dec. 26, 2023", w/English Translation, (Dec. 26, 2023), 8 pgs.

* cited by examiner

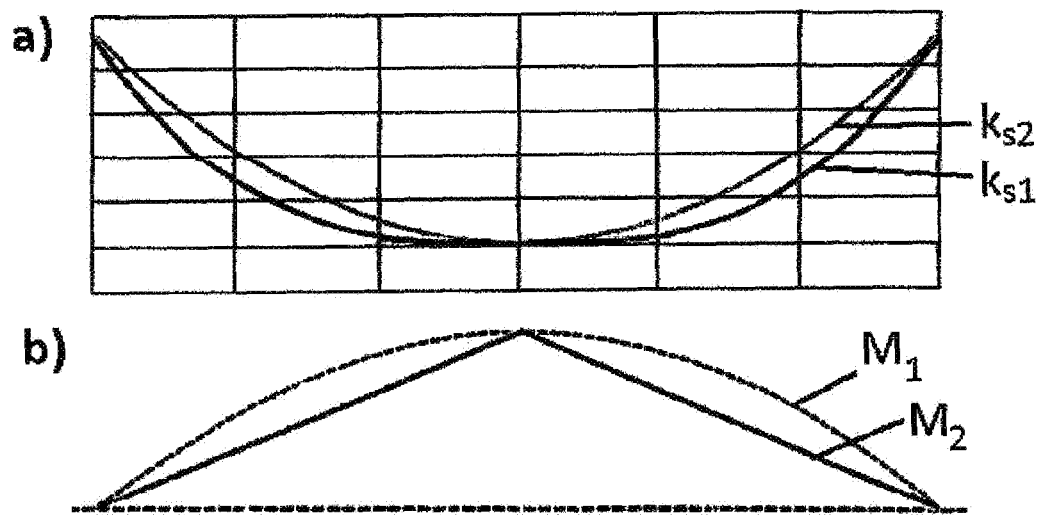
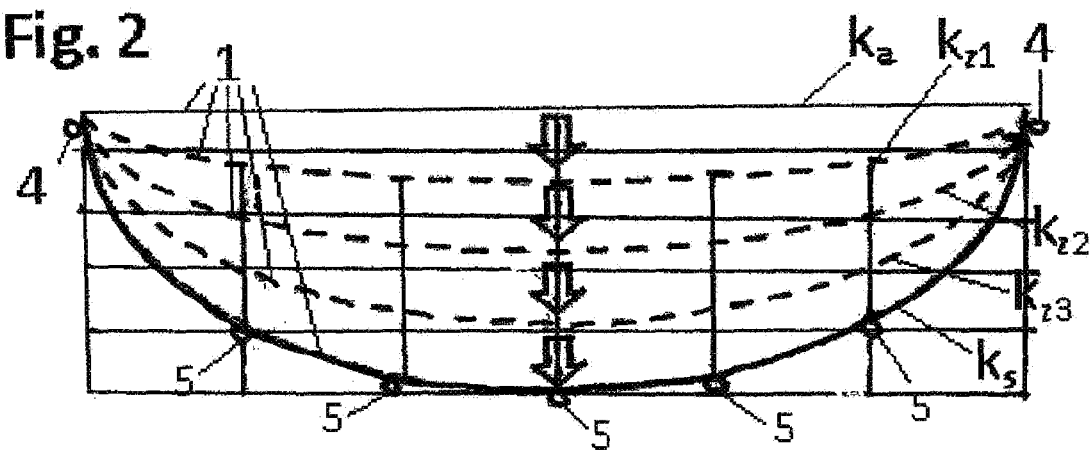

Fig. 3
a)
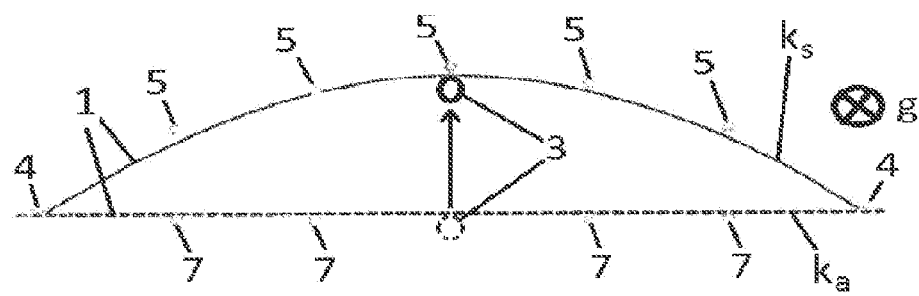
b)
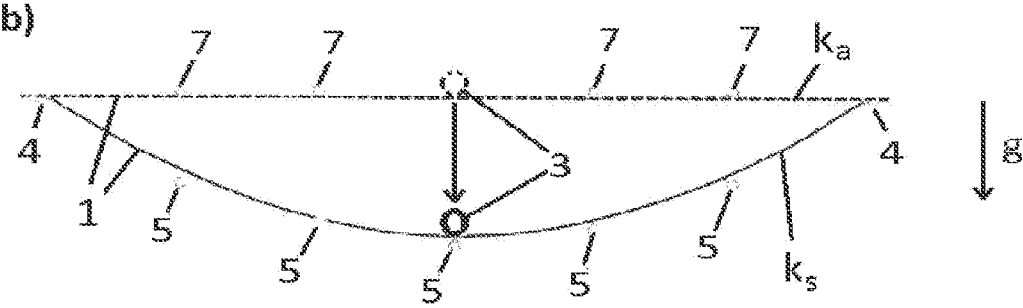

Fig. 9  PRIOR ART
a)
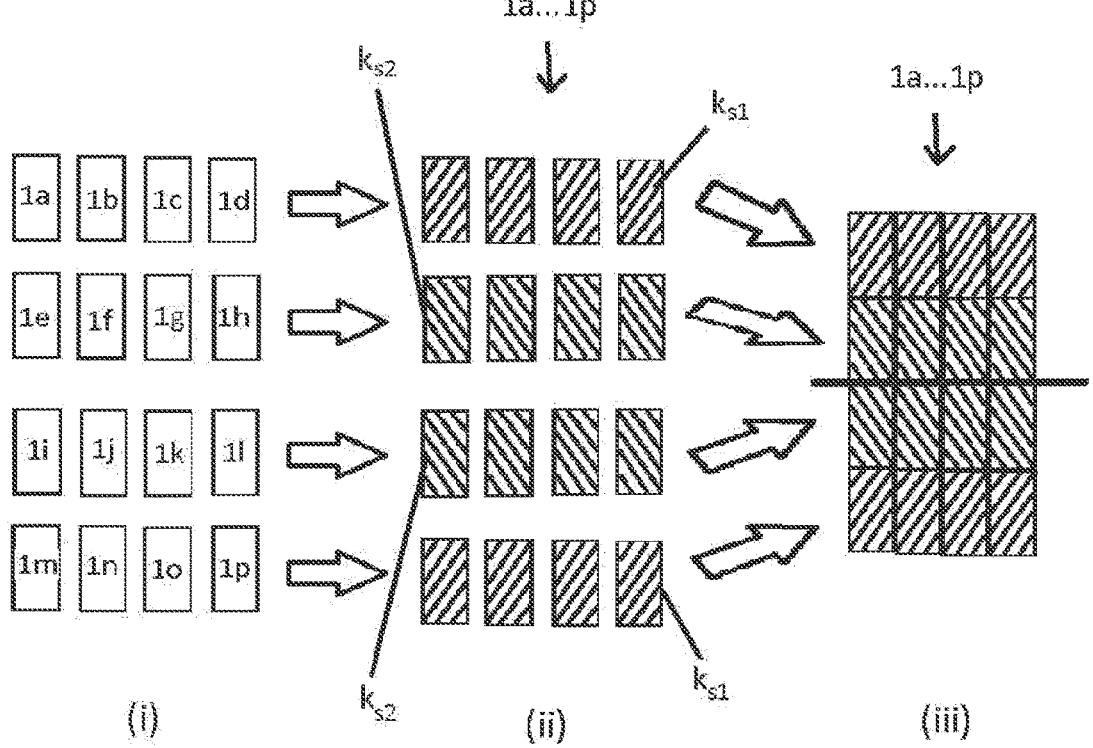
(i)   (ii)   (iii)
b)
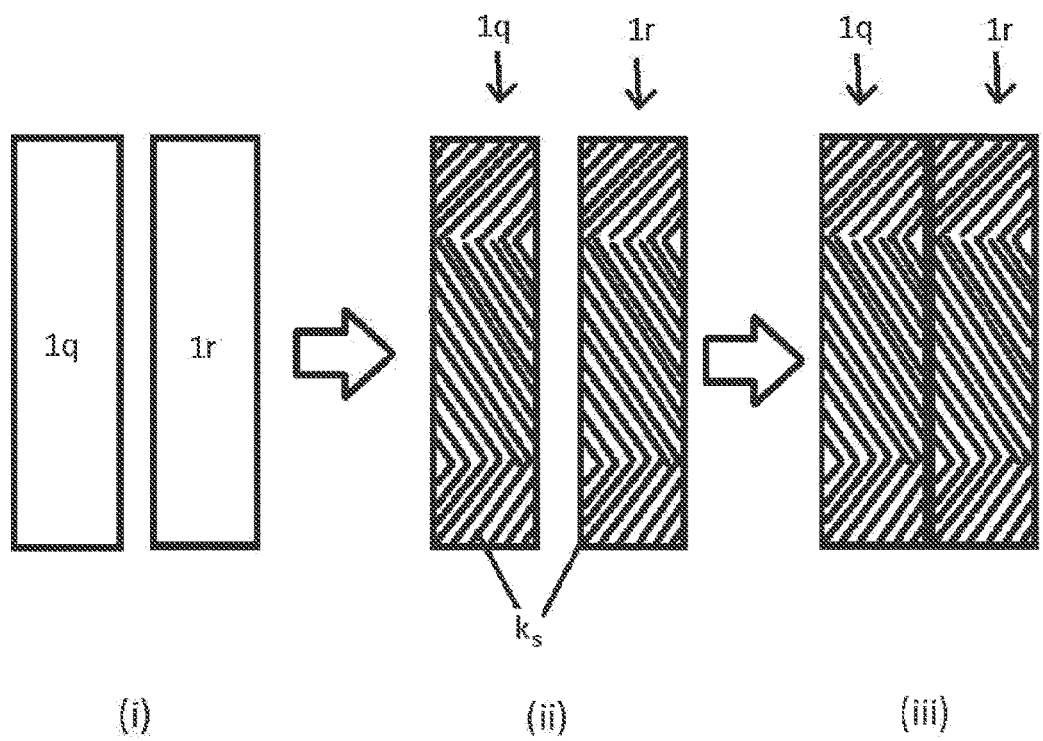
(i)   (ii)   (iii)

Fig. 10
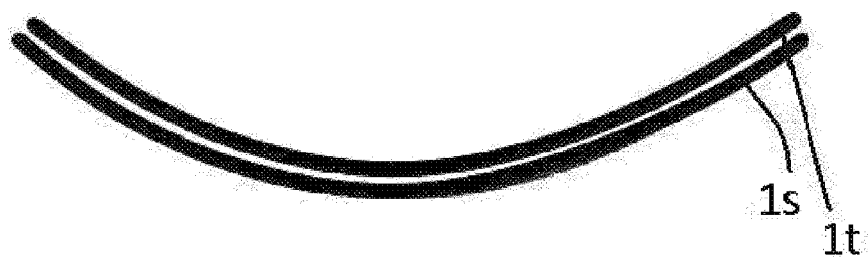
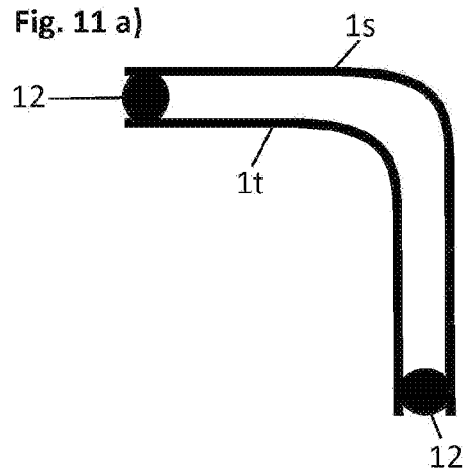
Fig. 11 a)
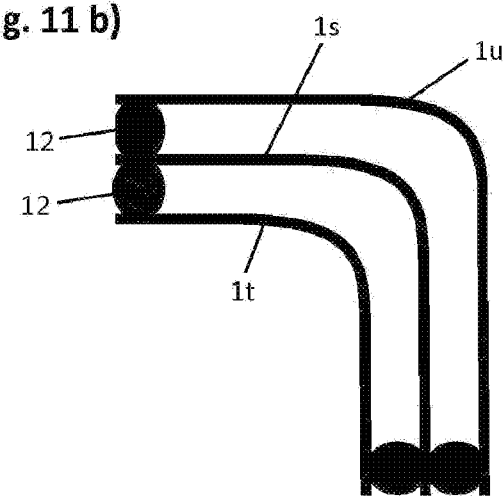
Fig. 11 b)
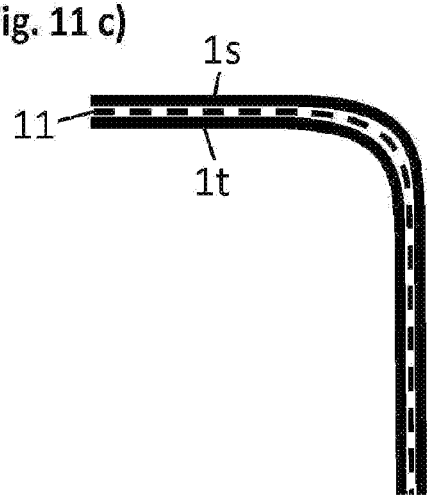
Fig. 11 c)
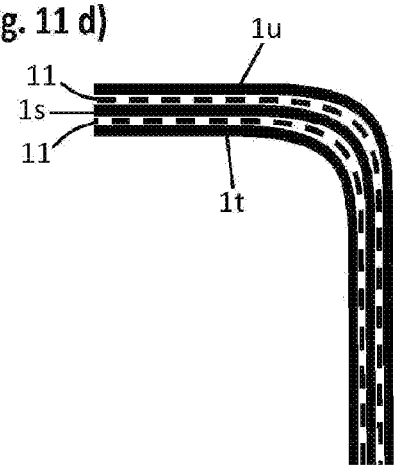
Fig. 11 d)

Fig. 14
a) 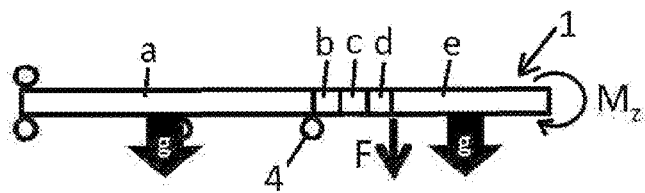
b) Target curvature k 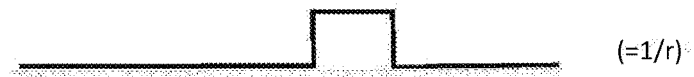 (=1/r)
c) Bending moment $M_g$ from force of gravity g 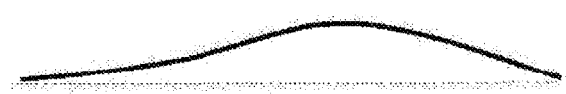
d) Bending moment from additional moment $M_z$ 
e) Bending moment $M_F$ from additional force F 
f) Bending moment total $M_{ges}$  (=$M_g$ + $M_z$ + $M_F$)
g) Viscosity curve η from temperature b,c,d 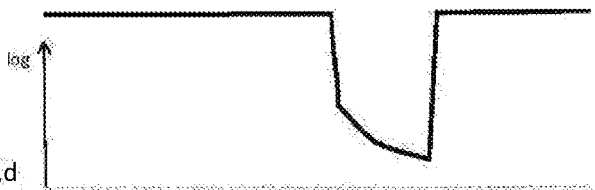
h) Product $M_{ges}/η (\approx k/t)$ 

METHOD FOR SHAPING GLASS PANES

PRIORITY APPLICATIONS

This application is a U.S. National Stage Filing under 35 U.S.C. § 371 from International Application No. PCT/EP2019/070638, filed on Jul. 31, 2019, and published as WO2020/025678 on Feb. 6, 2020, which claims the benefit of priority to German Application No. 10 2018 212 796.4, filed on Jul. 31, 2018; the benefit of priority of each of which is hereby claimed herein, and which applications and publication are hereby incorporated herein by reference in their entirety.

TECHNICAL FIELD

The invention relates to a method for shaping glass panes. The invention furthermore relates to a method for producing systems comprising bent glass panes.

BACKGROUND

Bent glass panes, frequently in large dimensions, that satisfy high quality requirements are needed, for example, in architecture, in vehicle construction, or for industrial applications, such as solar thermal power plants. So as to meet aesthetic or functional demands, bends that are true to the contour and have precisely predefined bending curves and smooth, corrugation-free surfaces are often required.

SUMMARY

Document FR 412 231 shows a mold for bending glass in which a contour is predefined by tubes. The glass pane is heated and, due to the inherent weight thereof, conforms to the mold under the influence of gravity.

Such methods have the disadvantage that the progression of the bending process cannot be precisely controlled, and the processes take relatively long. For the glass pane to conform well to the mold, the glass pane additionally has to be considerably heated, in particular when the molds are complicated. When the glass pane then gradually conforms to the mold, undesirable additional deformations arise as a result of the high temperature or as a result of the glass pane settling in an uncontrolled manner, and corrugations arise due to the tubes on which the glass pane ends up resting.

It is the object of the present invention to provide a method by which controlled and precise forming of glass panes becomes possible and undesirable deformations are avoided.

This is achieved by a method having the features of independent claim 1. Advantageous embodiments will be apparent from the dependent claims as well as from the description and the figures.

In the method, a glass pane is initially heated and then bent until it has reached a shape that corresponds to a predefined target contour.

Exterior forces are applied to the glass pane so as to bend the glass pane, wherein the exterior forces are limited to one or more forces of the following list:
  weight forces caused by the inherent weight of the glass pane;
  forces that are transferred to surface regions of the glass pane by supports on which the glass pane rests;
  forces that are transferred at the edge of the glass pane into the glass pane by mounts into which an edge of the glass pane is clamped;
  pressure forces that are transferred into a surface of the glass pane by one or more pressure strips, no more than one strip being used in each concave subregion of the surface.

According to the invention, a change in a local curvature of the glass pane over time is controlled such that the surface of the glass pane simultaneously achieves the target contour at all points of the surface that do not remain static during the shaping operation.

The change in the local curvature over time can be controlled by setting a temperature, and thus a viscosity of the glass pane, so as not to be constant during bending as a function of the location. As an alternative or in addition, the change of the local curvature over time can be controlled by appropriately setting the forces transferred by the mounts and/or the pressure forces transferred by the one or more pressure strips.

Accordingly, in the invention the sum of the local bending moments resulting from the acting forces (selected from the above-described options) can be set such that the bending process ends at the same time throughout (that is, for all areas of the glass pane). In possible embodiments of the method, initially a bending moment that is required for a particular curvature can be calculated or analyzed. Based thereon, the forces and moments, along with levers that may be relevant for setting the bending moment, can be selected. This selection can thus relate to the type of force or of the force transfer means as well as the type of securing of the glass pane. The viscosity of the glass pane may be taken into consideration in the determination of the required bending moment, which, in turn, can be set locally, according to the method, so as to allow the target contour to be achieved simultaneously. In practice, the possible viscosity settings are thus contrasted by the possible bending moment settings. In some instances, the setting of the two parameters are subject to physical or practical boundaries, so that during an analysis of the two possible settable parameters the process can be optimized, so as to be able to render the bending process as economical as possible. This process can be applied both once to the entire glass pane, and consecutively to subregions of the glass pane in multiple operations corresponding to the above description.

In typical embodiments, a total of no more than one pressure strip is used. In principle, however, there may also be multiple pressure strips, when this is necessary to achieve the requisite bending moment progression. The direction of action of the individual pressure strips can be identical or different.

Due to the fact that the shaping operation is completed at the same time throughout, as described above, it is possible to avoid that individual regions of the glass pane are completely shaped sooner than others and, after the shaping operation has been completed, additionally become undesirably deformed, while the remaining regions have not yet achieved the target contour. In this way, furthermore an overall duration of the forming process can be optimized.

The shaping operation can be delimited by contact areas circumscribing the target contour. The contact areas can be carried along with the glass pane during the deformation.

When the glass pane, after the shaping operation, for example makes contact in contact areas, which can be formed as tubes, for example, the simultaneous completion of the forming process in all moving pane regions can avoid individual regions from making contact earlier, and from inadvertently becoming further deformed due to the pressure of the contact areas.

As mentioned, no more than one pressure strip is used in each concave subregion. It shall be mentioned that this also covers configurations in which the force is transferred in multiple force transfer points or areas, wherein corresponding force transfer means, for example, are disposed close together, such as in a line or directly adjacent to one another, and/or corresponding force transfer means for force transfer are moved jointly. For methods according to the application, the exact configuration of the pressure strip or the arrangement of the force transfer points or areas may be of lesser relevance. Rather, one aspect of the described method that is relevant for several embodiments is that the use in the region in which the sign of the curvature of the target contour does not change does not involve multiple concave-side strips that are moved independently of one another.

For the progression of a local curvature $k_i(t)$ over time, which is to be controlled in the method for all points i of the glass pane, a dependence of the shape applies at the point i:

$$k_i(t) \propto M_i * t / (\eta_i(T) * I_i).$$

$M_i$ is the locally acting bending moment, t is the time, T is the temperature, $\eta_i(T)$ is the viscosity which indicates the local plastic deformability and is dependent on the temperature, and $I_i$ is the local geometric moment of inertia. The symbol $\propto$ denotes "is proportional to."

The geometric moment of inertia $I_i$ is usually predefined for a given glass pane by the dimensions and is not variable.

The curvature furthermore, but in particular, depends on the transferred bending moment, which results from the acting forces, and the viscosity, which is temperature-dependent. Within the meaning of the invention, each of these two parameters, by itself, can be locally varied, while the respective other remains unchanged. It is also possible, however, to locally vary both parameters.

The local shaping operation is determined by the ratio of the bending moment to the viscosity (M/η). In the case of variable cross-sections, the local geometric moment of inertia may also have to be taken into consideration, if necessary.

With a possible procedure, initially exterior forces are transferred at a homogeneous temperature, and thus a homogeneous viscosity. Due to outside boundary conditions, this procedure is subject to limitations in some instances, for example due to the action of gravity, which in some cases cannot be set as needed. It is also not possible, for example, to arbitrarily establish bearing areas and force transfer points, so that a design of the bending moment progression by way of the force transfer is subject to limitations. So as to overcome these limitations, it is provided to influence the ratio (M/n) by a controlled temperature distribution, and to control the shaping operation in this way.

For a desired time-dependent curvature, the required ratio $M/\eta_i$ can be determined at any location and for any point in time of the forming process. The ratio per se and/or the numerator and nominator taken alone can be kept constant across the bending process or be varied over time.

The possible variation of the transferred bending moment takes place by varying or controlling the transferred force locally. The possible variation of the viscosity takes place by varying or controlling the temperature of the glass pane locally. So as to control the temperature, the glass pane can be heated by way of a laser, for example. However, other methods can also be used for heating, such as a furnace having a locally settable temperature.

The glass panes can, for example, have a thickness of at least 3 mm and/or no more than 10 mm.

The variation of the forces and of the temperature will be described in greater detail below.

When the glass pane, for example, is only bent using no more than one pressure strip, while it is held at the edge by mounts by which additional forces are transferred, or while it rests at the edge on supports, the glass pane can be bent into the target contour in such a way that this is achieved simultaneously by all points of the glass pane, wherein the target contour can have an analytical curve. This may be a parabolic shape or a segment of a circle, for example, in which the glass pane is bent along one of the extensions thereof. In particular, the glass pane can assume such a shape across the full length. This represents a difference compared to the related art, according to which such contours are either not achieved simultaneously, or the analytical curve is not given across the entire glass pane, but rather a force is transferred segment by segment into the glass pane through the use of a multitude of pressure strips or other force transfer means so that a polygon-like contour is imparted to the glass pane.

It shall be emphasized that, according to the prior art, contact areas are used which describe the target contour, thereby predefining it, so that the glass pane sags during heating and conforms to the target contour. According to the prior art, the bending line of the glass pane is independent of the target contour. As the shaping operation progresses, the sagging glass pane incrementally makes contact, often in random order. With increasing contact with the contact areas, the bearing conditions change, and thus the bending moment curve. When the pane has sagged completely, the target contour is achieved, but the glass pane has experienced a succession of bending moments, which is determined by the time-delayed settling. In this way, undesirable contour deviations and corrugations arise.

In contrast, such contact areas are not required at all in the method described here for bringing the glass pane into the desired contour. The shaping operation is controlled by suitable process conditions, forces, bending moments and temperatures; all that is needed is to stop the shaping operation at the right point in time. The latter can be achieved with target contact areas in some instances. These are thus only used to end the shaping operation at the right point, and to open up a larger process window, in terms of time. Such target contact areas, however, are also not absolutely necessary for ending the shaping operation, for example when the glass pane is disposed so that gravity has no influence on the shaping operation, and the process can be ended by ending the force transfer.

The method described here, in particular, advantageously allows a shaping operation of glass panes in which the target contour includes a region that has the shape of a segment of a circle or a quadratic parabolic shape.

In one embodiment, in particular the time-dependent curvature can solely be controlled by locally varying the transferred force, while the temperature and/or the viscosity is the same, or substantially the same, everywhere in the glass pane. On the other hand, in an alternative embodiment, the time-dependent curvature can solely be controlled by locally varying the temperature, while the acting force is solely gravity acting on the glass pane.

In the described methods, a control of the force and/or of the temperature can follow a preset curve. This can, for example, be calculated in advance, for example by way of previously known physical properties of a glass pane to be bent, or can be ascertained by way of experimentation. Advanced material models for thermal conductivity, viscosity and temperature distribution can be used during a prior calculation, which are incorporated, for example, into numerical and/or analytical calculations.

By varying the parameters $M_i$ and $\eta_i$ over time, additional options for controlling and, if necessary, also correcting the bending process arise.

In the provided method, the temperature of the glass pane and/or the deformation of the glass pane can be monitored. For example, optical measuring devices can be provided for monitoring the temperature and/or the deformation.

The temperature of the glass pane can thus be monitored during bending, at least in regions to be bent. This can take place thermographically, for example, such as by way of a thermographic camera. However, as an alternative or in addition, thermocouples can also be used.

For measuring the deformation, it is possible, for example, to use cameras, such as stereo cameras, and/or laser distance sensors and/or laser scanners.

In the process, the product Aramis can be used, for example. This is a (stereo) camera-based evaluation system, which can be used for the non-contact measurement of contours. It is possible to measure three-dimensional deformations after the process, or also in-situ, by a succession of images.

In possible methods according to the present application, the temperature, and thus the viscosity, of the glass pane can be controlled during the bending operation as a function of the location, based on the temperature and/or the deformation of the glass pane. As an alternative or in addition, the transferred forces can be controlled, based on the temperature and/or the deformation of the glass pane. It is thus possible to control, in particular, the forces that are transferred by the mounts and/or the pressure forces transferred by the one pressure strip or by the multiple pressure strips.

A method according to the application can, for example, encompass several or all of the following steps in the order in which they are mentioned, or in another order:

(a) calculating $M/\eta$ based on the desired target contour, for all points on the surface of the glass pane;
(b) calculating locally acting bending moments that are present due to boundary conditions, such as storage conditions and/or gravity;
(c) calculating forces, or a progression of forces over time, which can be transferred by way of pressure strips and/or mounts, for optimizing the bending moments;
(d) calculating a local temperature field for setting the $M/\eta$ distribution determined in step (a); and
(e) transferring the forces ascertained in step (c), and setting the temperature ascertained in step (d).

Step (b), for example, takes the boundary conditions predefined by a bending tool into account. Steps (c) and (d) are usually carried out as a function of one another. For example, the transferrable forces from (c) may be limited by the bending tool. The temperature settings from (d) may act in a correcting manner, in addition to the transferred forces, for example in the case of target contours that cannot solely be achieved with the present pressure strips or mounts, or when pressure strips or mounts are to be largely or completely avoided.

The temperature control in step (e) can take place by local energy input, for example using a laser by which the glass pane is locally irradiated. The energy input can be adapted by way of a residence time of the laser at a particular location and/or by way of a beam power.

A method as described above may be controlled, for example, by a self-learning system, for example by way of an artificial neural network. Such a method can comprise one or more additional steps, for example the following steps in this or another order:

(f) detecting the temperature, for example at measuring points in a furnace and/or by way of a thermographic camera for measuring the temperature of the glass pane;
(g) detecting the deformation, for example in situ, such as by way of Aramis and/or by way of a laser scanner or a laser measuring system;
(h) comparing the actual temperature and the target temperature; comparing the actual contour and the target contour;
(j) processing deviations from (h) and/or (i),
(k) calculating corrective parameters from the deviations from (j),
(l) correcting the temperature, for example by correcting the power distribution of the laser and/or the force, for example by adapting a movement of the mounts and/or of the pressure strip(s); and
(m) processing and collecting empirical values.

Steps (f) to (m) can then, for example, be repeated cyclically multiple times.

Hereafter, mechanical aspects of the method will be discussed in greater detail.

In the method, it is possible that the target contour is predefined by one or more target contact areas of a bending tool. In one possible embodiment, the glass pane does not make contact with these target contact areas during the bending operation, but does not end up resting on the target contact areas until the forming process has been completed. The glass pane is thus guided as little as possible so as to achieve the above-described analytical curve and avoid pressure points.

The forces that are transferred by the mounts can be tensile forces and/or torque. For example, torque can be transferred at opposing edges of the glass pane, such as by rotating the mounts in opposite directions, so that the glass pane deforms and assumes a target contour that, for example, corresponds to a segment of a circle.

However, it is also possible to use mounts by which the glass pane is tensioned at opposing edges, wherein the glass pane then is incrementally deformed, by easing the tension, with a weight force that, at the beginning of the shaping operation, is directed orthogonally with respect to the surface of the glass pane. The deformation can then be ended by placing the glass pane in a mold that is predefined by the bending tool or by the mounts not yielding further, and by finally cooling the glass pane. All these methods allow target contours to be achieved that differ from a contour that the glass pane would conform to if it were only supported at the edges, and only the weight force were acting thereon.

The target contour can comprise multiple regions that are bent in opposite directions. A sign of a curvature can thus change between two adjoining regions. It is thus possible, for example, to impart multiple arches, for example in a S shape, to the pane. A pressure strip can be provided for each arch. The bending of the arches extending in opposite directions can be carried out simultaneously or in chronologically consecutive bending processes.

The aforementioned variation of the temperature can be spatially varied locally along a first extension direction of the glass pane, and can be set so as to be constant, or substantially constant, in a second extension direction extending orthogonally with respect to the first extension direction. Such temperature patterns favor one-dimensional bending. Two-dimensional variable temperature patterns are likewise possible in other embodiments.

When the temperature in the second extension direction is set so as to be constant, the temperature of the glass pane along the first extension direction can be set so as to be constant in sections. In this way, strip-shaped equithermal sections are created. These equithermal sections can, for example, have widths of at least 1.5 mm and/or no more than 1 m. In particular, those of the equithermal sections to which a curvature is imparted or in which a curvature is varied can have widths of at least 1.5 mm or 3 mm or 4 mm or 0.5 cm and/or of no more than 1 m.

A laser for heating the glass pane by which such equithermal sections can be brought about can, for example, have a spot size of 5 mm. It is also possible to use moving heating zones with other heating means for equithermal regions.

A first temperature of a first such equithermal section of the glass pane to which a curvature is imparted can differ from a second temperature of a second equithermal section of the glass pane to which a curvature is imparted by, for example, at least 1 kelvin or at least 5 kelvin or at least 10 kelvin and/or no more than 30 kelvin.

Two such equithermal sections to each of which, for example, curvatures are to be imparted can, for example, abut one another. However, it is also possible for an additional transition region to be located between these, in which, for example, a different temperature is present and/or in which the temperature continuously changes spatially and/or to which no curvature is imparted.

For example, two, three, four or more equithermal sections can be provided, to each of which curvatures are to be imparted, wherein the temperature of each of the equithermal sections differs from the temperature of one or two equithermal sections adjoining the region, wherein adjoining equithermal sections can abut one another, or a transition region can be provided between adjoining sections.

For example, a first equithermal section can have a temperature between 615° C. and 625° C., a second equithermal section adjoining the first section can have a temperature between 635° C. and 645° C., and a possible third equithermal section adjoining the second equithermal section can have a temperature that is higher or lower than the second section by 1 K or 5 K or K to 30 K.

In possible embodiments of the method, a radius of curvature imparted to a region of the glass pane can, for example, be smaller than 100 mm or smaller than 10 mm, or 5 mm or less. This region can include one or more of the aforementioned equithermal sections. Using the described method, it is thus possible to create contours that have very small bending radii and appear as accentuated edges. For example, the bending radii can approximately correspond to the thicknesses of the glass pane.

In the method, it is possible to only heat those regions of the glass pane in a targeted manner to which a curvature is imparted. In this way, energy can be saved. These regions can also again be composed of, or comprise, the equithermal sections.

It is furthermore possible not to heat regions to which no curvature is imparted, and/or regions in which, for example, target contact areas, guidance contact areas, supports or mounts are present, or at least to maintain these at colder temperatures, in particular below the softening temperature, so as to prevent undesirable deformation in these regions.

An embodiment of the method shall be described hereafter by way of example, which can in particular be suitable for imparting small radii of curvature.

In this embodiment of the method, the glass pane is supported in such a way that a portion of the glass pane which is to be moved during the deformation process protrudes, so that the protruding section is at least also moved by the weight force. In possible embodiments, no further force is transferred aside from the weight force. In other possible embodiments, additional forces are transferred so as to set a desired bending moment. The additional forces can, for example, be transferred by pressure strips or by means of clamps.

An achievable inner radius of curvature to be set in the method can, for example, approximately correspond to the thickness of the glass pane, or also be slightly less than that. For example, it is at least 2.5 mm or at least 3 mm or at least 4 mm. For example, it can be no more than 300 mm.

In the method, a curvature can be imparted to an interior section of the glass pane, while no curvature is imparted to remaining exterior sections. In the process, the temperature of the glass pane can be varied locally along a first extension direction of the glass pane as a function of the location, and can be set so as to be constant in a second extension direction extending orthogonally with respect to the first extension direction as a function of the location. In the process, several, that is, for example, at least two, regions having differing temperatures may be present in the interior section, having a temperature that in each case is above the deformation temperature. The temperature can be maintained below the deformation temperature in the exterior regions in the process. The deformation can then only be introduced in the interior section, and thus in a spatially delimited area, which can correspond to a particularly sharp bend.

A width of the interior section in the first extension direction can, for example, be at least the glass thickness or at least 3 mm or at least 4 mm. On the other hand, it can, for example, be no more than 200 mm or no more than 100 mm or no more than 50 mm. The bend is then only imparted to an accordingly wide strip, thereby creating a sharp bend.

So as to achieve a specifically desired progression of the bend, at least three or at least four or at least five equithermal regions having differing temperatures may be present in the interior region. This shall be understood to mean that each of these regions has a temperature that is different from the adjoining region, and the temperature can thus be set in an accordingly narrow strip. This, of course, does not preclude the fact that mutually adjoining regions can, at least temporarily, also have an identical temperature so as to achieve a desired bend. What is essential for the method is a particularly exact adaptation of the bend, achievable by such precisely settable strips. A maximum number of equithermal regions having different temperatures which are present in the interior region, within the above-described meaning, can be 15, for example. On the one hand, an advantage of the invention can be that bends that are as sharp as possible can be achieved when the strips are selected to be accordingly narrow. On the other hand, however, the method is also suitable for imparting a bend to a relatively large strip which follows a certain shape with much greater precision than is possible with existing methods. For example, a desired bend can be imparted to a section of up to 250 mm or 200 mm or, for example, of up to 20 times the glass thickness. For example, a segment of a circle (for example a quadrant) can be imparted to a strip having such a width. Here as well it is possible to introduce a plurality of equithermal strips, for example up to 20.

Each of the regions having differing temperatures in the interior section can, for example, have a width, measured in the first extension direction, of at least 1.5 mm or at least 2 mm. At least one of the regions can have a width of no more than 12 mm, preferably no more than 10 mm, and particularly preferably no more than 8 mm. It is also possible that at least one of the regions has a width that corresponds to no more than three times, or no more than two times, the glass thickness. In possible embodiments, all the regions in the interior section have this maximum width.

For example, it is possible that the target contour in the interior section has a constant radius of curvature, that is, the bent glass pane there forms the shape of a segment of a circle. In the process, for example, the interior sections can have a temperature that, spatially, increases steadily from one region to another, wherein the section located closest to the supported section can have the lowest temperature.

The described method, including all the possible described embodiments thereof, can be used to bend large panes. This means that it is not only suited for small panes or panes having standard dimensions, having individual sides that, for example, have a maximum length of 1.7 m, but in particular also for panes having larger dimensions. For example, it is possible to bend panes having at least one side length that is at least 6 m or at least 9 m or between 16 and 20 m. For example, in the case of panes that have one side having a length between 16 and 20 m, this side 16 to 20 m long can be bent using a method as described above.

It shall be emphasized that, according to the application, such large panes can be bent in one piece, for example so as to assume a target contour which follows an analytical curve, such as a quadratic parabola or a segment of a circle. Prior to the bending process, the panes do not have to be divided, nor do they have to be bent polygon-like in a segmented manner through the use of multiple pressure strips.

One example of an application of a method as described above is the production of a bent double glazed unit or a multiple glazed unit. In the case of such a double glazed unit or multiple glazed unit, which can be used in architecture, for example, an insulating gap, which is filled with a medium, for example, is at least provided between two panes, for example.

According to the state of the art, the two panes of the double glazed units are bent as a pair so as to produce such double glazed units, wherein the panes rest on top of one another. Contour errors arising from bending methods according to the prior art are thus present in both panes, thereby ensuring at least accuracy of fit.

In the present application, a method for producing double glazed units or multiple glazed units in which a first glass pane and a second glass pane are bent separately, each by a method according to the present application, is provided as a possible application of the method described above. Thereafter, the first and second glass panes can be disposed on top of one another in a planar manner, and the panes can be joined to one another, an insulating gap remaining between the first and second glass panes. Due to the precise controllability of the method according to the present application, it can be ensured that each of the panes is highly true to the contour, so that the panes reproduce the desired shape well, and additionally fit one another.

In a further embodiment of the method, it is also possible that a first glass pane is bent by a method according to the application, and thereafter is joined to a second glass pane, wherein the second glass pane does not necessarily have to be bent. For example, a certain structure can be introduced into the first glass pane, and this first glass pane can be joined to the second, flat glass pane. In this way, a formed space can be produced between the first and second glass panes and/or a structure can be provided on an outer side of the multiple glazed unit. Additional material, for example, can also be introduced into the formed space, for example for special applications, and the formed space can be adapted thereto. There are no limitations as to the state of aggregation of the additional material. For example, it can be a gas or electronic components, or also a solid or a fluid, and can fulfill an aesthetic purpose or a functional purpose.

The method for producing a multiple glazed unit comprising multiple bent, in particular sharply bent, glass panes that are disposed on top of one another in a planar manner can, for example, include the above-described variant method in which each of the glass panes is bent by being supported in such a way that a portion of the glass pane that is to be moved during the deformation process protrudes, so that the protruding section is at least also moved by the weight force. In the process, a fixation of the supported section can furthermore take place.

In this way, an introduction of small radii of curvature is particularly advantageously made possible, that is, a production of particularly sharply bent multiple glazed units can be made possible, wherein the radius of curvature in each of the glass panes present therein can be set particularly precisely.

In the method for producing a multiple glazed unit or a double glazed unit, the first glass pane and the second glass pane can thus each be bent separately by a method according to the application, and the first and second glass panes can subsequently be disposed on top of one another in a planar manner.

In the method for producing a multiple glazed unit, the radii of curvature in the first and second glass panes can be selected in such a way, and the panes can be disposed against one another in such a way, that a distance can be created between these, wherein this spacing preferably has the same size, or substantially the same size, throughout. In this way, a particularly exactly fitting shape can be made possible. This spacing can remain as an insulating gap and/or a film and/or a spacer can be disposed therein. It is also possible for the additional material to be disposed in this spacing, for example for special applications.

In particular when the temperature, during bending of each of the glass panes of the multiple glazed unit, is set so that two or more regions having differing temperatures are present in the interior section, the curvature can be set particularly precisely in all glass panes of the multiple glazed unit. For example, during the bending operation of the different glass panes, the radii of curvature can be adapted to the respectively adjoining glass panes, wherein additionally also interposed possible spacers or even film thicknesses can be precisely taken into consideration.

In possible embodiments of double glazed units or multiple glazed units according to the present application, the pane pair has a sharp bend or curvature of between 30° and 120°, and in particular angles of 80° to 100°. A radius of curvature of such a double glazed pane can, for example, range between 5 mm and 20 mm.

Another possible application of the described method relates to the production of laminated solar cells. In the case of such solar cells, a solar cell is laminated onto the rear side of a glass pane bent by the method shown here. For sealing purposes, a plastic film or a further glass pane that is bent with precise fit by the described method can be laminated onto the rear side of the solar cell which faces away from the glass pane.

In the present application, a method for producing a parabolic trough is provided as a further possible use of the above-described method. In this method, a plurality of glass panes are bent separately, each by a method according to the present application. Each of the panes is, for example, brought into a quadratic parabolic shape. This can be carried out, for example, using a single pressure strip, with or without the influence of gravity. No mounts have to be used in the process, but instead the glass panes can each be mounted at the edges thereof, or in the vicinity of the edges thereof, on supports and, by means of the pressure strip, can be pressed against these supports.

The bent glass panes are placed against one another at the bent edges thereof. A spacing can remain between these, but they may also be placed edge to edge on top of one another and, optionally, can also be joined to one another. The glass panes thus bent are then usually disposed next to one another along a longitudinal direction of the parabolic trough. Each of the bent glass panes typically extends across an entire width of the parabolic trough, which can be defined orthogonal to the longitudinal direction, for example. This represents a difference compared to the prior art, according to which the parabolic troughs are assembled according to the widths thereof from multiple glass panes. Due to the described single-piece design in the width direction and a corresponding design that is true to the contour, the performance capability of the parabolic trough can be considerably increased thanks to the method according to the application.

The use of methods according to the application is also suitable for producing other possible glass panes with decorative or technical, in particular, optical uses.

The products that can be produced or processed by way of the described method, in particular bent glass panes, double or multiple glazed units, as well as parabolic troughs shall be described hereafter again in greater detail.

In the case of a multiple glazed unit according to the application, a first glass pane and a second glass pane can each be shaped according to the method described here, and can be equidistantly disposed on top of one another in a planar manner. In the process, the glass panes can each comprise at least one interior section, in which a radius of curvature is smaller than in adjoining sections (in particular, it is possible that no curvature at all is present in the adjoining sections, but that the glass panes are flat there). The radius of curvature of the second glass pane can be smaller in the interior section than the radius of curvature of the first glass pane in the interior section, wherein the second glass pane is shaped and disposed on the concave side at the first pane in such a way that a gap remains between the first and second glass panes. As a result of the equidistant arrangement, which can advantageously be implemented due to the described bending method, the gap has the same width throughout. This corresponds to a particularly upscale and visually appealing multiple glazed unit.

It is possible for spacers and/or a film, in particular a non-breaking plastic film, to be disposed in the gap. For insulation purposes, it is furthermore possible for a gas, such as argon or krypton, to be introduced into the gap, in particular when spacers are provided therein, or the gap may be evacuated.

A smallest inner radius of curvature of the glass panes of the multiple glazed unit can, for example, approximately correspond to or be slightly less than the glass thickness. For example, it can be at least 2.5 mm or at least 3 mm or at least 4 mm. On the other hand, it can be no more than 300 mm.

An angle between the two sections adjoining the interior section which is determined by the curvature can, for example, be at least 20', preferably at least 45', and/or no more than 135', preferably no more than 100°.

Furthermore, a third glass pane, which is shaped according to the described method, can be equidistantly disposed in a planar manner on the convex side at the first glass pane in the multiple glazed unit, or it can be equidistantly disposed in a planar manner on the concave side at the second glass pane. At the composite thus created, it is also possible for one or more further bent glass panes to be disposed on the concave side and/or the convex side.

For example, a parabolic trough according to the present application is characterized by multiple parabolically bent glass panes, which are placed against one another in the longitudinal direction at the bent edges thereof, wherein each of the bent glass panes extends across an entire width of the parabolic trough extending orthogonally to the longitudinal direction.

It shall be emphasized that, on the one hand, the invention is directed to bent glass panes, double or multiple glazed units as well as parabolic troughs, which were shaped or produced by a method as described above, on the other hand, however, the applicant also reserves the right to claim the glass panes, double or multiple glazed units and parabolic troughs by themselves, independently of the aforementioned production method. In particular, the invention thus also relates to parabolic troughs and to double and multiple glazed units having the above-described properties, which can be claimed by themselves. The invention furthermore relates to a bending tool, which may be claimed by itself and which comprises force transfer means, such as a pressure strip and/or mounts, and/or devices for temperature control, such as a laser, which are each configured to carry out a method as described here. The features mentioned in connection with the method can be applied to the bent glass panes produced thereby as well as to the bending tool for carrying out the method.

The invention will be described in more detail hereafter by way of example based on the drawings.

BRIEF DESCRIPTION OF THE DRAWINGS

FIGS. 1a-b show bending lines with the associated bending moment curve;

FIG. 2 shows a chronological progression of a deformation of a glass pane;

FIGS. 3a-b show a deformation of a glass pane by means of a pressure strip;

FIGS. 9a-b show a production process of parabolic troughs;

FIG. 10 shows a double glazed unit according to the present application;

FIGS. 14a-h show illustrations of different physical quantities that can be manipulated in methods according to the application.

DETAILED DESCRIPTION

FIG. 1a) shows possible bending lines $k_{s1}$ and $k_{s2}$ for glass panes supported at the ends thereof, and FIG. 1B) shows the associated bending moments $M_1$ and $M_2$. The bending line $k_{s1}$ corresponds to a cubical parabola, and the bending line $k_{s2}$ corresponds to a quadratic parabola. The bending moment $M_1$ associated with $k_{s1}$ has a parabolic progression and is, for example, caused by a line load, that is, for example, by a weight force acting on the entire surface area of the glass pane. In contrast, the bending moment associated with $k_{s2}$ has a progression that increases in a linear manner toward the center. This is effectuated, for example, by a force acting at the center. This means that a glass pane which is supported at the edges thereof and on which only the weight force acts, under these conditions, will settle in accordance with a cubical parabola. If different shapes are desired, this can be ensured, as in the prior art, by a corresponding mold, however, certain regions of the glass pane will then settle into the mold before other regions of the glass pane and, disadvantageously, will inadvertently be further deformed and/or become corrugated. According to the present application, for example, a pressure strip is used so as to generate the bending moment $M_2$, for example. As an alternative or in addition, the bending behavior can be influenced by adapting the viscosity by way of a variation of the temperature. These options will be described in greater detail based on the following figures.

FIG. 2 shows a process according to the application, in which a glass pane 1, in the vicinity of the edges thereof, bears on supports 4. The glass pane 1, as is illustrated by arrows, is shaped from a starting contour k a to a target contour $k_s$, which in the present case is defined by the supports 4 and by target contact areas 5. In the process, the glass pane 1 passes intermediate contours $k_{z1}$-$k_{z3}$.

The glass pane can, for example, be a soda-lime glass pane, which can be deformed at temperatures starting at approximately 600° C. A thickness of the glass pane can, for example, range between 2 mm and 10 mm.

For the shaping operation, the glass pane is initially heated and then bent in that exterior forces act on the glass pane 1 at least until it reaches a shape that corresponds to the target contour $k_s$.

Figure 4:
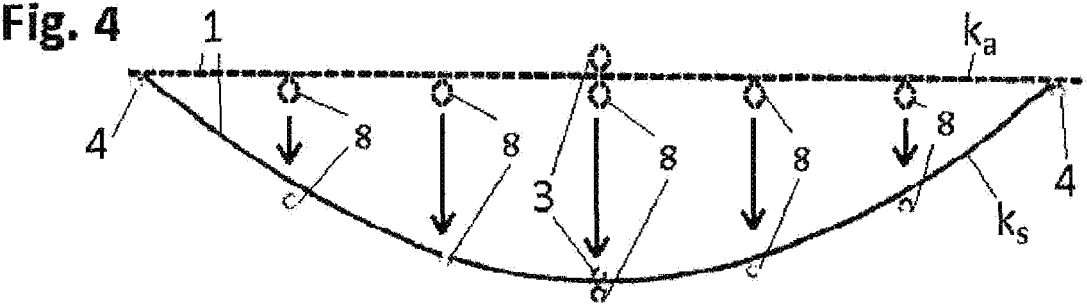
FIG. 4 shows a deformation of a glass pane by means of a pressure strip and movable guidance contact areas.
Figure 5:
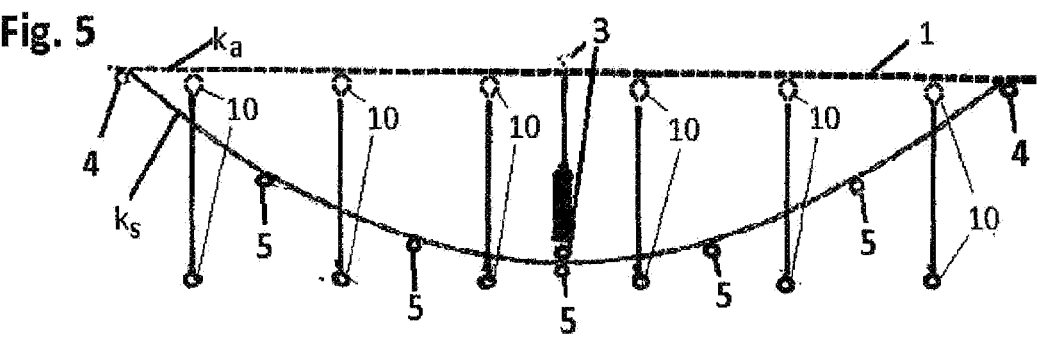
FIG. 5 shows a deformation of a glass pane by means of a pressure strip and movable starting contact areas.

The exterior forces are limited in the process to
weight forces caused by an inherent weight of the glass pane 1 (see FIG. 3b and FIG. 8) and/or
forces transferred to the glass pane 1 by the supports 4 and/or
forces transferred by potential mounts into which an edge of the glass pane is clamped (see FIGS. 6 and 7), and/or
pressure forces transferred by one or more pressure strips into a surface of the glass pane 1, wherein no more than one pressure strip is used in each concave subregion of the surface (see FIGS. 3 to 5).

A change of a local curvature of the glass pane 1 over time identified in the figure, from the starting contour $k_a$, via the intermediate contours $k_{z1}$, $k_{z2}$ and $k_{z3}$, to the target contour $k_s$, is controlled in the process in such a way that the surface of the glass pane 1 simultaneously achieves the target contour $k_s$ in all areas of the surface that do not remain static. The glass pane thus settles simultaneously onto all five shown target contact areas 5, so that the shaping process is completed at the same time throughout. This is achieved by not setting a temperature, and thus a viscosity, of the glass pane 1 so as to be constant as a function of the location during the bending operation, and/or by suitably setting forces that are transferred by potential mounts and/or the pressure forces transferred by the one or more possible pressure strips 3 for this purpose. This means that, in order to control the change of the curvature k(t) over time, the ratio of the bending moment and the viscosity n, which is proportional to the curvature due to $$k(t) \propto M/\eta$$

is set in a controlled manner at all times of the bending process, and in all locations of the glass pane (a denotes is "proportional to"). The bending moment M can be modified by varying the forces, and the viscosity n can be modified by varying the temperature. One of these variables can be varied in the process, or both can be varied.

Process variables such as heat input, temperature and duration of the heat input can be ascertained and optimized in simulation models.

The supports 4 can, for example, be formed as tubes or in a tubular manner and act as floating mountings for the glass pane 1. The target contact areas 5 are optional for bending tools for carrying out methods described herein, and can be formed as tubes or in a tubular manner. In the shown example, the glass pane 1 only makes contact with the target contact areas, which are formed to be immovable, after having reached the target contour $k_s$, and at earlier points in time during the bending process is only controlled and deformed by supports 4 and, for example, by pressure strips and/or gravity.

The temperature of the glass pane 1 and the deformation of the glass pane 1 can be monitored during the bending process. This means that, at different points in time, for example when the glass pane achieves the intermediate contours $k_{z1}$-$k_{z3}$, the curvature and the temperature can be determined in a spatially resolved manner using optical devices, such as by means of a thermographic camera and/or by means of a laser. Based on the temperature and/or the deformation of the glass pane, the temperature, and thus the viscosity, of the glass pane 1 can be controlled during the bending operation as a function of the location, and the forces, as described above, can be controlled so as to ensure that the target contour $k_s$ is simultaneously achieved for all regions of the glass pane 1.

The heating of the glass pane 1 and the setting of the temperature of the glass pane 1 are carried out by means of a laser, for example. Other types of force transfer in methods according to the application are shown in FIGS. 3 to 8, by way of example. This means that the force transfer methods described there can be used in the method described here and can be carried out in a controlled manner in connection with the control described here.

FIG. 3 shows embodiments of processes according to the application in which a pressure force is transferred to the glass pane by means of a pressure strip 3. The glass pane rests on supports 4 in the process. The pressure strip 3 is disposed in each case centrally between the supports 4 on the side of the glass pane 1 facing away from the supports. The glass pane 1 can additionally be fixed in the starting position thereof by additional optional starting contact areas 7, which are disposed on the same side as the pressure strip 3. The pressure strip 3 pushes the heated glass pane 1 against the respective supports 4 and is moved between and through the supports 4, so as to impart a curvature to the glass pane 1. The pressure strip 3 in each case accordingly pushes centrally against the glass pane 1 on the concave side. The starting contour $k_a$ is flat in both cases, and the target contour $k_s$ is a quadratic parabola in both cases, which is predefined by the supports 4 and the target contact areas 5.

In contrast to FIG. 3b), the glass pane in FIG. 3a) is oriented in such a way that the gravity field of the Earth g acts parallel to the surface of the glass pane 1, and thereby has no influence whatsoever on the deformation of the glass pane 1. This means that only the force that is transferred by the pressure strip 3 in a spatially delimited manner along a line effectuates the deformation, so that a bending moment corresponding to the bending moment $M_2$ from FIG. 1 is present in pure form. This can be advantageous for achieving the desired target contour. In particular in embodiments according to FIG. 3a), the bending process can be stopped at any arbitrary point in time, wherein a contour obtained as a result always represents a quadratic parabola.

In FIG. 3b), in contrast, the glass pane 1 is oriented in such a way that the gravity field of the Earth g, and thus the weight force, are directed orthogonal with respect to the surface of the glass pane 1 that is not bent. The glass pane 1 is thereby pressed onto the supports 4, or the deformation can then be supported by the force of gravity. As mentioned, the force of gravity acting in this way alone does not result in the desired target contour $k_s$ at a homogeneous temperature of the glass pane 1. This means that the temperature should be either adapted and/or the force should be transferred in such a way that the contribution of the force of gravity is compensated for or neglected. In the shown example, the force is transferred by the pressure strip 3 so quickly that contributions of the force of gravity can be neglected.

In the examples from FIGS. 3a) and b), the glass pane 1 can in each case have a spatially homogeneous temperature, which does not vary over time, but may also have a locally and/or temporally varying temperature, for example so as to effectuate corrections of the progression of the curvature over time.

In the case of FIG. 3b), it is also possible, for example, for the temperature to vary spatially and temporally, so as to compensate for a possible contribution of the force of gravity to the deformation that would not bend the glass pane to the desired parabolic shape.

FIG. 4 shows a bending process according to the application for the glass pane 1, which is carried out or predefined as in FIG. 3 by means of a pressure 3 disposed between two supports 4. The force of gravity acts orthogonally with respect to the surface of the glass pane 1 in the process. In this example, the plate is supported from beneath, on the side facing away from the pressure strip 3, by movable guidance contact areas 8, which carry a portion of the load of the glass pane 1 at least prior to the start of the bending operation. The guidance contact areas 8 are lowered during the bending process and have reached a shape at the end of the shaping process that corresponds to the target contour $k_s$. There may be overlap between shaping as a result of the individual load of the pressure strip 3 and as a result of the weight force, wherein the first usually dominates. The guidance contact areas 8 can be guided in accordance with Steiner's formula at points that form part of the desired parabolic shape. It is also possible to move the guidance contact areas 8 in such a way that the target contour $s_k$ has a different shape. The corresponding deformation can be controlled by varying the temperature of the glass pane 1. Guidance contact areas can also play a partial role in the corresponding deformation, for example in a direction opposite the deformation effectuated by the pressure strip 3. The guidance contact areas 8 can then act as additional pressure strips, of which, for example, no more than one is used in each concave subregion of the surface.

In an alternative embodiment of such a method using movable guidance contact areas 8, the force of gravity can also act parallel to the surface of the glass pane 1.

FIG. 5 shows a configuration according to the application, including movable starting contact areas 10, which, similarly to the movable contact areas 8 from FIG. 4, carry a portion of the load of the glass pane 1, at least prior to the start of the bending operation, while the weight force acts orthogonally with respect to the surface of the glass pane 1. During the bending operation, the movable starting contact areas 10 can be moved downwardly, for example following the current contour of the glass pane 1. In contrast to the movable guidance contact areas 8, the movable starting contact area 10, however, does not serve as a target contact area. Additional target contact areas 5 are provided, which limit the movement of the glass pane 1 and define the target contour $k_s$ of the glass pane 1 together with the bending contact areas 4.

In an alternative embodiment having the features shown in FIG. 5, the force of gravity can also act parallel to the surface of the glass pane 1.

Figure 6:
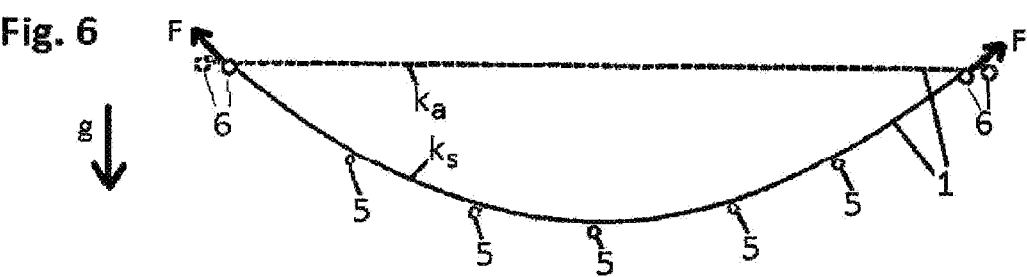
FIG. 6 shows a deformation of a glass pane by means of mounts, by the introduction of a tensile load.

FIG. 6 shows a method according to the application in which the glass pane 1 is clamped in mounts 6 at opposing edges. The weight force acts perpendicularly to the surface of the glass pane 1 and effectuates the deformation. The target contour skis predefined by target contact areas 5. Tensile forces are transferred to the glass pane 1 by the mounts 6, that is, the edges of the glass pane 1 are pulled outwardly by the mounts 6, and the glass pane 1 is lowered into the mold during the bending process, while easing the tension in a controlled manner and correspondingly, moving the mounts 6 toward one another, so that all points of the surface of the glass pane 1 achieve the target contour $s_k$ at the same time. As a result of such a force transfer, the glass pane 1 can, for example, be brought into the target contour $k_s$ again, which has a quadratic parabolic shape.

Figure 7:
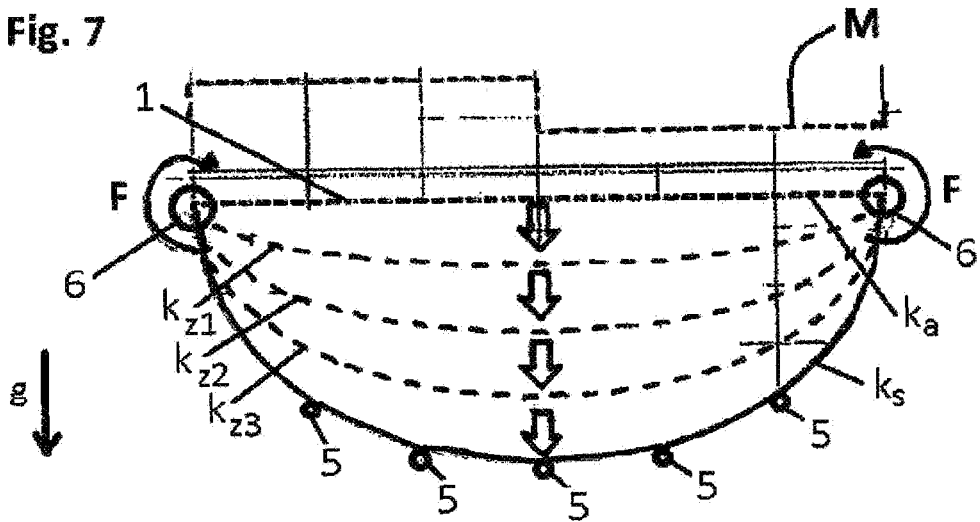
FIG. 7 shows a deformation of a glass pane by means of mounts, by the introduction of torque.

FIG. 7 shows a method according to the application in which torque is introduced by the mounts 6, in which the glass pane 1 is clamped at opposing edges. The mounts 6 are rotated in opposite directions, as illustrated by arrows in the figure. The resulting bending moment M is outlined in the figure and has a discontinuity. Proceeding from the target contour $k_a$, the glass pane is deformed in a controlled manner via the intermediate contours $k_{z1}$-$k_{z3}$ to the target contour $k_s$, which represents a segment of a circle, such as a semi-circle. In particular circular segment-like target contours can advantageously be achieved by this kind of force transfer.

In such embodiments, in which the deforming forces are transferred by way of such torque, the target contact areas 5 are optional. In the shown example, the force of gravity acts orthogonally with respect to the surface of the glass pane 1, but may also act parallel to the surface of the glass pane 1.

In embodiments comprising mounts 6, the transfer of tensile forces (FIG. 6) and the application of torque (FIG. 7) can also be combined, for example so as to be able to control the deformation with even greater precision, and, for example, enable other target contours.

Figure 8:
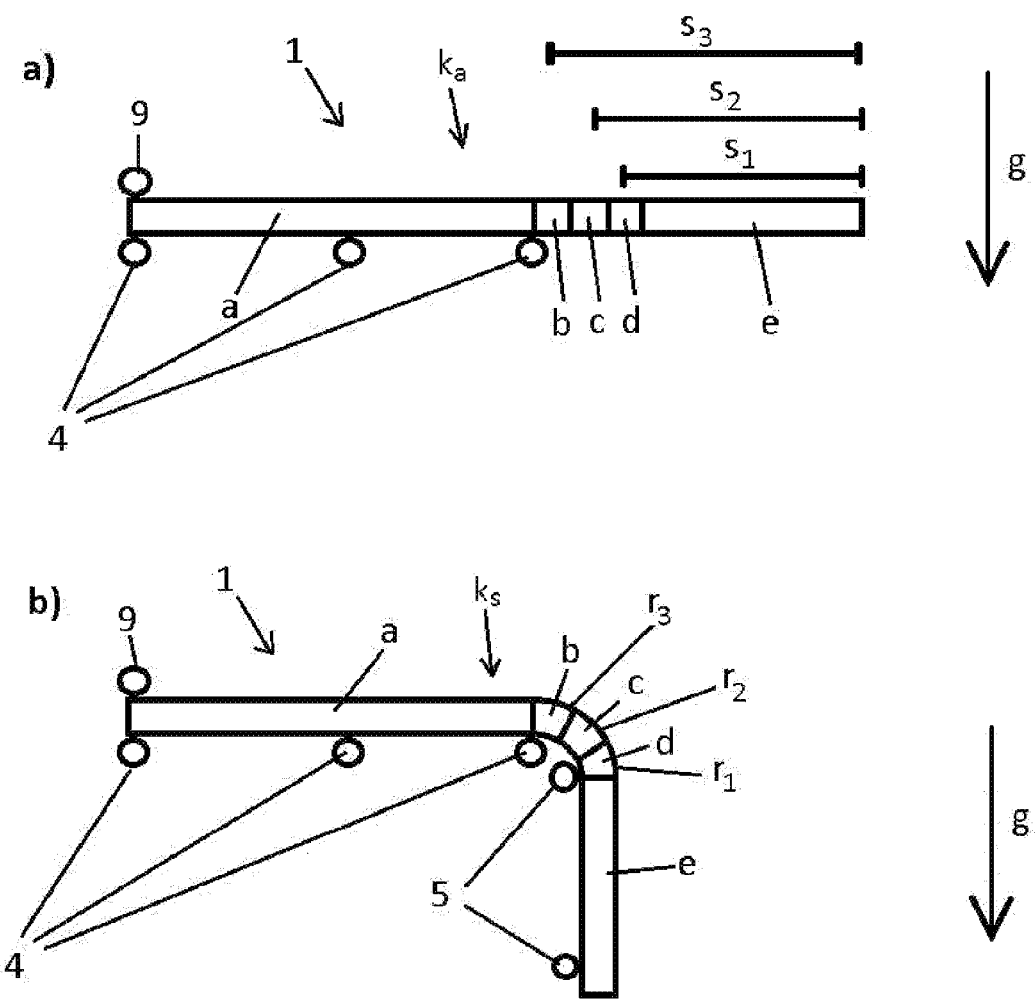
FIGS. 8a-b show a temperature-controlled deformation of a glass pane.

FIG. 8 shows a method according to the application for bending the glass pane 1 from the starting contour $k_a$ (FIG. 8a) to the target contour $k_s$ (FIG. 8b), in which the temperature of the glass pane 1 is spatially varied locally along a first extension direction of the glass pane (horizontally in FIG. 8a), and is set so as to be constant in a second extension direction extending orthogonally with respect to the first extension direction (orthogonally with respect to the drawing plane).

The glass pane is placed onto supports 4 on which it is also fixed by an optional fixation 9. A region of the glass pane 1 which is to be moved during the deformation process protrudes beyond the supports 4. The deformation is now solely effectuated by the gravity field of the Earth g, and thus the weight force, which acts downwardly, as shown by the arrow in FIG. 8, and urges the region protruding beyond the supports 4 downwardly.

In the process, the temperature of the glass pane 1 is set so as to be constant in sections along the first extension direction, so that strip-shaped equithermal sections a-e arise, of which two outer sections a and e, to which no curvature is to be imparted, are colder than inner sections b, c, d, to each of which a curvature is to be imparted. In particular, the regions a and e can be so cold that the glass cannot be deformed in these regions. The section a corresponds exactly to the region that rests on the supports. The regions b, c, d to which the curvature is to be imparted are each between 5 cm and 1 m wide. The regions a and e are wider than the regions b, c and d.

The bending moment acting on the glass pane 1, which effectuates the deformation, is dependent on the weight of regions protruding beyond the supports 4 which, at a homogeneous density and constant width of the glass pane, is linearly dependent on the length of the protruding region. The bending moment is furthermore dependent on the lever arm of the protruding regions. This means that a bending moment, which is dependent on a segment length $s_1$ extending across the sections d and e, acts in the region d. Compared to the region d, a larger bending moment acts in the region c, which is dependent on a segment length $s_2$ extending across the sections c, d and e. An even greater bending moment acts in the region b, which is proportional to the segment length $s_3$ extending across the sections b, c, d and e.

So as to ensure a controlled deformation to the target contour $k_s$, within the meaning of the present application, the magnitude of the bending moment that acts in the regions b, c, d, to which the curvature is to be imparted, is to be taken into consideration in each of these regions.

As a result of the relationship, $$k(t) \propto M/\eta$$

the differing bending moments acting in sections b, c, and d are compensated for in this example by varying the viscosity n by way of the temperature. In this way, the time-dependent curvature can also be controlled when a change in the bending moments by way of additional forces is not contemplated. For example, so as to obtain an identical radius of curvature $r_1 = r_2 = r_3$ throughout in the regions b, c, and d, the regions must have differing viscosities due to the respective bending moments that act there being different in magnitude. So as to obtain a predefined curvature, a corresponding temperature adjustment thus has to be carried out. This temperature adjustment can be controlled according to a previously known pattern, or it can be controlled during the process while monitoring the actual contour and the actual temperature, based thereon. In the process, at least the temperature in the regions of the glass pane which are to be bent, that is, at least in the sections b, c, and d, is monitored during the bending operation, for example is thermographically monitored. The curvature is then also optically monitored, for example by means of a laser, at least in the same region, and the temperature is controlled and/or corrected by means of a laser.

The temperatures present in the sections b, c, and d can, for example, differ from one another in pairs by between 10 kelvin and 30 kelvin.

The radius of curvature $r_1 = r_2 = r_3$ established in the sections b, c, and d is 5 mm or less in this example.

At the end of the shaping process, the glass pane makes contact with target contact areas 5. The target contact areas 5 are optional and can, for example, in some embodiments be disposed so as to only make contact with the relatively cold section e, which, for example, cannot be deformed at the temperature thereof.

In methods such as that shown in FIG. 8, it is not precluded that the temperature within the sections b, c, and d varies slightly within the scope of what is technically feasible. In particular, a variation of the temperature across the thickness of the glass pane, by virtue of the process, is possible. Such temperature fluctuations within individual sections are typically less than the temperature differences compared to adjoining sections.

FIG. 9a) shows a method for producing a parabolic trough according to the prior art, and FIG. 9b) shows a method for producing a parabolic trough according to the present application.

It is shown in the process in FIG. 9a) how a parabolic trough having large dimensions is produced from a plurality of glass panes 1a-1p. The glass panes 1a-1p have standard sizes of, for example, a maximum side length of 1.7 m and are present in the non-bent form in FIG. 9a) (i). From (i) to (ii), each of the glass panes 1a-1p is bent in a method according to the prior art. In the process, a respective target contour $k_{s1}$ is created in glass panes 1e-1l to be disposed in an inner region of the parabolic trough, which is to correspond approximately to central segments of a quadratic parabola. Similarly, a respective target contour $1_{s2}$ is created for the glass panes 1a-1d and 1m-1p to be disposed further to the outside, which accordingly approximates segments of a quadratic parabola located further to the outside. The approximation of the quadratic parabola is typically not satisfactory for both the interior glass panes 1e-1l and for the exterior glass panes 1a-1d and 1m-1p, since, according to the prior art, as mentioned at the outset, cubical functions are to approximate the quadratic parabola. Furthermore, contour errors typically arise, by virtue of the process, in particular in the edge regions of the glass panes 1a-1p. The glass panes are joined as is shown in (iii), wherein the performance capability of the resulting parabolic trough, due to the aforementioned lack of the contours of individual glass panes 1a-1p, is not optimized.

FIG. 9b), in contrast, shows a method for producing a parabolic trough according to the present application. The parabolic trough is accordingly produced from glass panes 1a, 1r, which are bent separately in methods according to the present application. These can each be the glass pane 1 from one of FIGS. 2-6, for example.

The glass panes, which are initially present in flat form in (i), are bent from (i) to (ii) to a respective target contour $k_s$, which is parabolic. A design that is highly true to the contour is thus achieved by the methods described in the present application. As is identified by hatching in FIGS. 9a) and 9b), in the case of FIG. 9a) approximately the progression of an outer region of the parabolic target contour $k_s$ from FIG. 9b) is to be created for the glass panes 1a-1d and 1m-1p, and approximately the progression of an inner region of the parabolic target contour $k_s$ from FIG. 9b) is to be created for the glass panes 1e-1l. The design according to FIG. 9b) is considerably more true to the contour.

The bent glass panes 1q, 1r are placed against one another at the bent edges thereof, and are thus stringed along a longitudinal direction of the parabolic trough. Each of the bent glass panes thus extends across an entire width of the parabolic trough extending orthogonally with respect to the longitudinal direction. The parabolic trough shown in FIG. 9b) is characterized by particularly high performance capability, due to the design being highly true to the contour and being in one piece along the width.

Each of the glass panes $1q$, $1r$ has dimensions at which at least one side length is more than 6 m, for example between 16 and 20 m.

FIG. 9b shows two glass panes $1q$, $1r$, however it is also possible to use more than two glass panes having the same properties. It shall be mentioned that the glass panes $1q$, $1r$ can be disassembled after the bending operation in step (ii) for transport, and can be re-assembled at the desired location of the parabolic trough. The performance capability is only minimally impaired by the disassembly. Due to the design being true to the contour, high-performance parabolic troughs are also possible in the case of disassembled and assembled glass panes $1q$, $1r$. The one-piece design is typically ensured during the bending operation so as to yield the aforementioned design that is true to the contour.

FIG. 10 shows a double glazed unit, comprising a first glass pane $1s$ and a second glass pane $1t$, which are bent separately, each according to a method as shown in the present application. Thereafter, the first glass pane $1s$ and the second glass pane $1t$ were disposed, as shown, on top of one another in a planar manner. As a result of the precision achievable by the above-described methods, the double glazed unit can reliably reproduce a desired contour, and the glass panes $1s$ and $1t$ fit precisely on top of one another. Each of the glass panes $1s$, $1t$ is larger than 1.7 m×1.7 m.

The double glazed unit can be formed as laminated (safety) glass without a space remaining between the two panes $1s$, $1t$, comprising an interposed plastic film. It is also possible for an insulating gap to be present between the panes $1s$, $1t$, which, for example, is filled with a poorly heat-conducting gas such as argon, nitrogen or dry air, so as to provide the double glazed unit as an insulating glass pane. The glass panes $1s$, $1t$ are then sealingly bonded around the circumference, and spacers are additionally used.

FIGS. 11a to l show different embodiments of bent multiple glazed units. They share the common trait that the panes used were each bent individually and according to the application, for example using the method described in connection with FIG. 8. In addition, the bending radii of the panes of a double glazed unit are matched particularly precisely to one another, so as to achieve, at any rate, a particularly upscale multiple glazed unit having advantageous optical properties.

Figure 11:
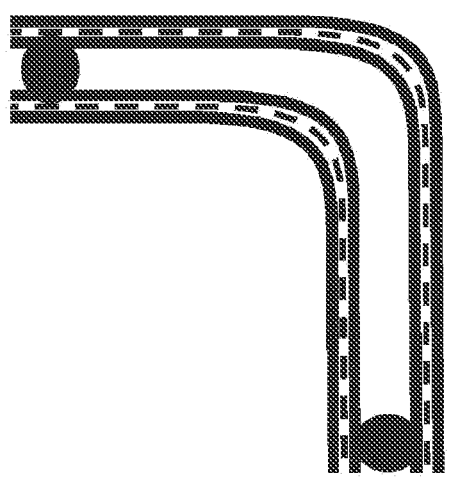
FIGS. 11a-l show multiple glazed units according to the present application in different embodiments.
Figure 11:
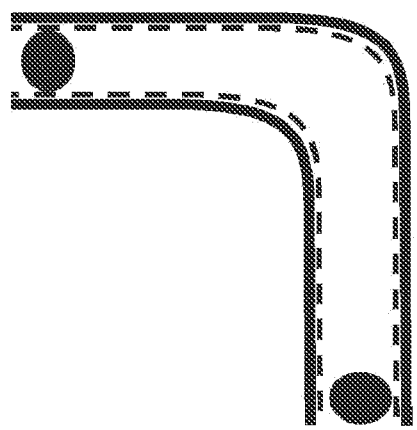
Figure 11:
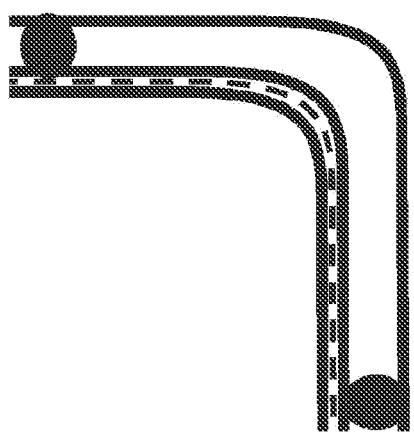
Figure 11:
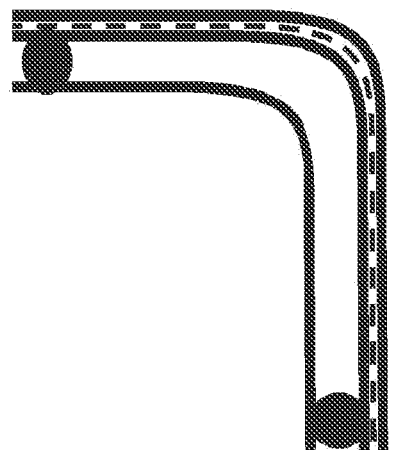
Figure 11:
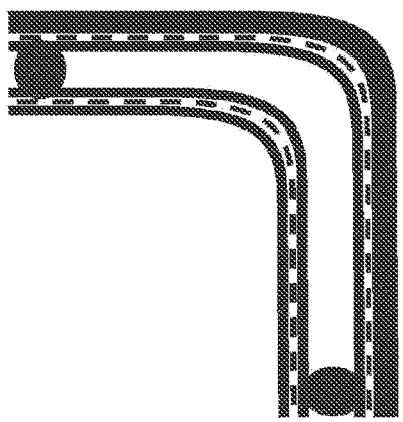
Figure 11:
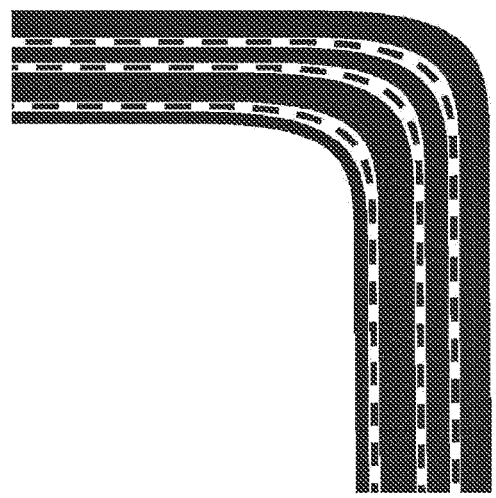
Figure 11:
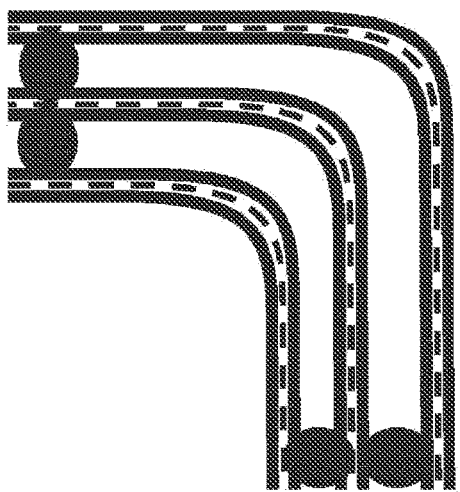
Figure 11:
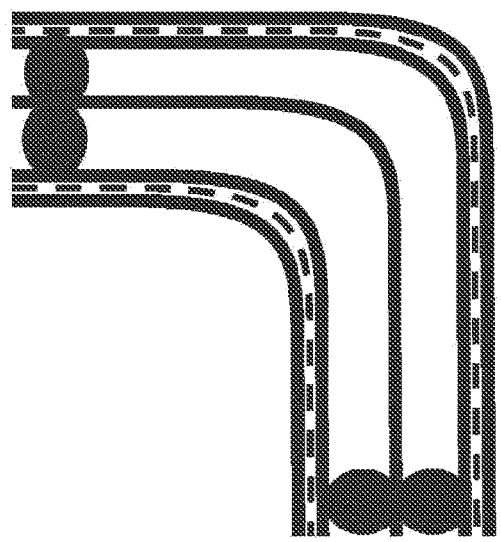

FIG. 11a shows a double glazed unit in which the second pane $1t$ is disposed on the concave side of the first pane $1s$. Spacers 12 are situated between the two panes. The bends imparted to the panes have a constant radius, and the two sections adjoining the bent regions each have an angle of 90 degrees with respect to one another. The panes are thus bent at a right angle, and the bent sections thus correspond to quadrants. The inner bending radius of the inner second pane is between 3 and 10 mm, for example. A section on which the pane assumes the quadrant shape is accordingly spatially delimited. For imparting the bend, the glass pane is thus overall only heated to above the deformation temperature in a strip-shaped inner section, wherein this strip-shaped section has a width of 30 to 50 mm. The inner bending radius of the first pane is accordingly larger than the inner bending radius of the second pane and is calculated from the inner bending radius of the second layer, plus the thickness of the second pane, plus the thickness of the spacers. The radius can be set in the process with millimeter precision. The pane thicknesses can, for example, be 3 or 4 mm in each case.

FIG. 11b shows a pane similar to FIG. 11a, this being a triple insulating glass pane, in which additionally, likewise including interposed spacers 12, a third pane $1u$ is disposed on the convex side of the first pane $1s$. The third pane likewise has a curved quarter circle segment, having a radius that is accordingly enlarged compared to the first pane. The gaps, which are delimited by the panes and the spacers 12, can, for example, be evacuated for insulation purposes, or be filled with a gas. The gaps have the same gap width throughout. The sections adjoining the inner bent regions form straight end pieces. However, further bends can be imparted to these sections, in the same direction or in the opposite direction.

FIG. 11c shows a double laminated safety glass pane. A film having a thickness between, for example, 0.7 mm and 1.6 mm is disposed between two glass panes $1s$, $1t$, each having a thickness of between 4 and 8 mm, for example. The panes again have 90° bends, which are implemented in spatially drastically delimited sections by quadrants.

A refinement of the embodiment from FIG. 11c is shown in FIG. 11d, which is a triple laminated safety glass pane. The panes and films each have the same dimensions as in the case of FIG. 11c. The bending radii are precisely matched to the film thicknesses and pane thicknesses, so as to avoid irregularities or air inclusions, which could represent an optical impairment.

FIG. 11e shows a double insulating laminated safety glass pane. Two elements, which are essentially composed as the safety panes from FIG. 11c, are joined to one another, and spaces are disposed therebetween so as to create a gap that can be evacuated or filled with gas. Such panes can particularly advantageously be used in architecture, for example in high-rises or observation decks, where special requirements exist in terms of safety, thermal insulation, and optical properties.

FIG. 11f shows another double insulating laminated safety glass pane.

A respective film is laminated onto two panes, and these two panes are joined to one another with spacers. This is another way to ensure increased safety in the event of glass breakage and favorable insulating capacity.

FIGS. 11g and 11h show two possible variants of an insulating laminated pane, in which either only the concave-side or only the convex-side pane comprises a film. Depending on requirements, the film can thus also only be provided on one side. If the film, for example, is to be provided on the exterior side of a building, it can be disposed on the correspondingly exterior pane. Depending on the desired design, the concave-side or the convex-side pane can, in turn, form the exterior pane.

FIG. 11i shows an insulating laminated safety glass pane comprising bullet-proof glass. The design thereof corresponds to the principle shown in FIG. 11e. Here, however, instead of a conventional glass pane, a bullet-proof pane having a thickness of 8 to 10 mm is disposed on the convex side, serving as the outermost pane. The remaining panes have a thickness of 4 mm.

Another multiple glazed unit comprising bullet-proof glass is shown in FIG. 11j. Here, a plurality of films and panes are alternately disposed, wherein the panes are alternately conventional 4 mm panes and bullet-proof glass. Panes are located on the very outside and the very inside.

FIGS. 11k and l, finally, illustrate the option of rendering particularly well-insulating laminated panes safer, comprising two gaps according to the example of FIG. 11b, in that at least a portion of the panes from 11b is replaced with a double pane comprising a film. Specifically, it is provided to form the innermost layer and the outermost layer as a double pane comprising a film (FIG. 11*l*), or even all three (FIG. 11*k*).

Figure 12:
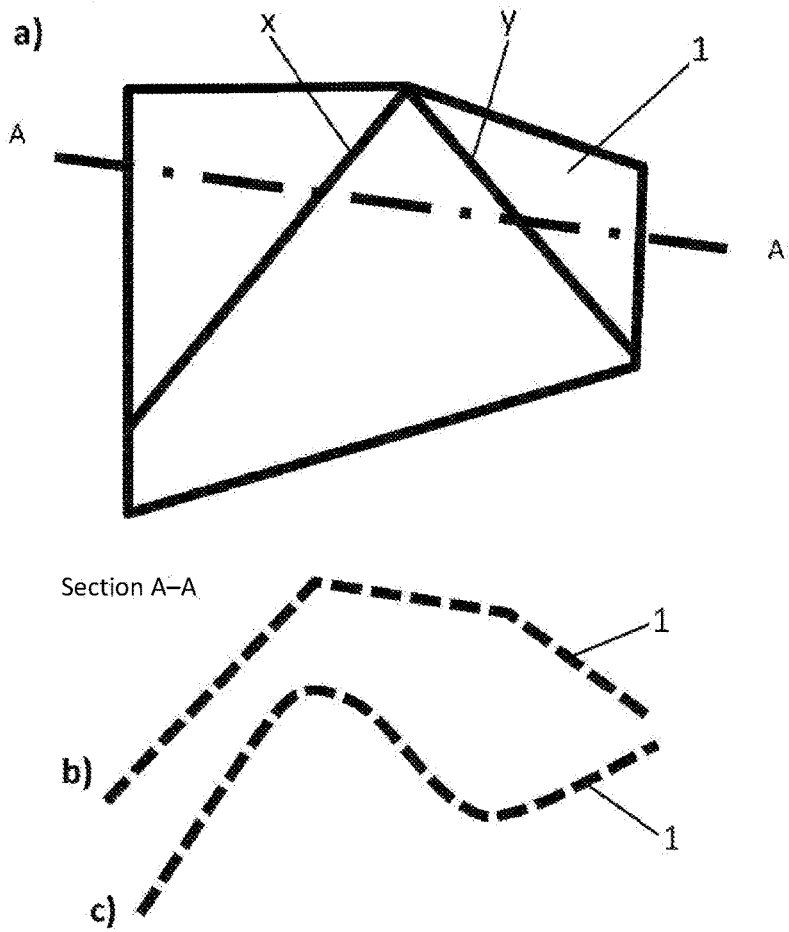
FIGS. 12a-c show views of a glass pane having a curved 3D structure, in different embodiments.

FIGS. 12*a-c* show views of a glass pane having a curved 3D structure. FIG. 12*a* shows how a pane that can be produced by the shown methods can be configured. The structures producible according to the application are thus, in particular, not limited to 2D or quasi-2D structures. Rather, two or more bends can be imparted, which in particular do not have to be parallel to one another. FIGS. 12*b* and 12*c* in each case illustrate section A-A through FIG. 12*a*, wherein in the case of FIG. 12*b* two sharp bends are imparted along the lines x and y. So as to produce such a structure, for example, the center region of the glass pane may be supported, and the regions located outside of x and y can protrude. Narrow strips can then be heated along the lines x and y, so that the protruding sections sag under the influence of gravity. In the process, the sharp bends can again correspond to segments of circles having radii of a few millimeters. The two bends can in particular be imparted simultaneously. An alternative to the embodiment from FIG. 12*b* is shown in FIG. 12*c*. Section A-A is likewise shown here. Instead of sharp bends, curved shapes are involved here, which additionally have opposite bending directions. Such shapes can in particular be imparted using pressure strips and/or gravity and/or clamps (see FIGS. 1*a* to 7). Pressure strips can be used, for example, on opposite sides of the pane, essentially along the lines x and y. The bends here can be imparted simultaneously or consecutively.

Figure 13:
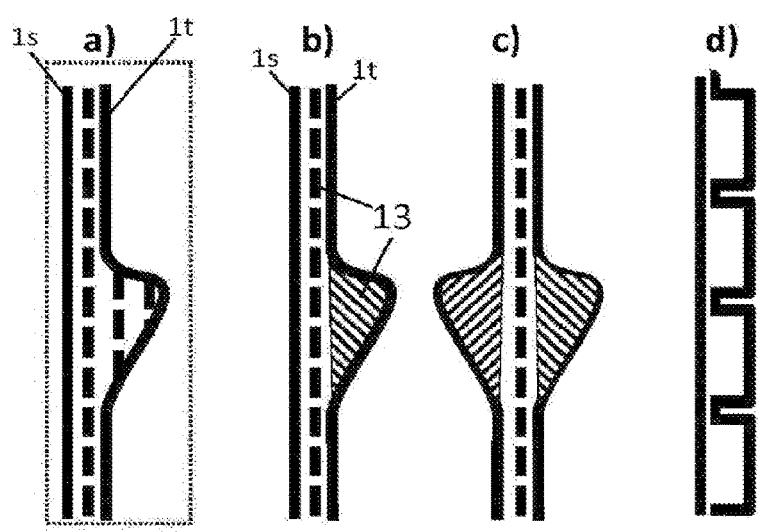
FIGS. 13a-d show multiple glazed units in the form of structured double glazed elements.

FIGS. 16*a-d* show structured double glazed elements in which at least one pane is bent using a method according to the application. A second pane can have a flat shape (FIG. 13*a, b, d*) or can likewise be bent (FIG. 13*c*). The two panes can be laminated to one another, for example using an additional film therebetween. As a result of the deformation of one of the panes, a cavity can be formed between the panes, which thanks to the method can have a complex and very precisely settable shape. It is also possible, of course, to create more than one cavity. The cavities thus created can be used, for example, to introduce additional material 13 therein. The additional material can be a functional element. For example, it may be electronic components or cables. The cavity can also form a channel for a medium or be configured as a pocket. The additional material can be liquid, solid or gaseous. The bent pane is typically limited in terms of the possible shape thereof. Only one surface or one region has to be provided, which allows it to be joined to the second pane.

FIGS. 14*a-h* illustrate the physical process again on which the method illustrated in FIG. 8 is based. In particular, physical variables are shown in FIGS. 14*b* to *h*, which can be varied spatially along the length of the glass pane 1 shown in FIG. 14*a* in the method according to the application. FIG. 14*a* shows the glass pane again, which rests on the supports 4, so that a portion thereof protrudes. The protruding portion is now to be bent downwardly under the influence of the plotted gravity g, wherein a curvature is to be imparted to the inner section formed of the regions b, c, and d. The regions or sections a and e adjoining the inner section are to remain non-deformed (of course, this does not preclude the regions a and e, for example, having already been shaped in preceding steps and, in turn, not being flat at all, but already having a curvature). Accordingly, only the inner regions b, c, and d are heated to above the deformation temperature for the bending operation. FIG. 14*b* shows the corresponding target curvature by regions. The target curvature is to vanish in the regions a and e, and is to remain constant across the regions b, c, d. The bending moment $M_g$ acting on the glass pane, which results from the force of gravity, is plotted in FIG. 14*c* across the length of the glass pane 1. It is already apparent here that according to the relationship $k_t(t) \propto M_i * t / (\eta_i(T) * I_i)$ described at the outset, the desired curvature cannot be producible solely by the bending moment stemming from the force of gravity. Accordingly, the temperature, and thus the viscosity, of the glass pane are not set so as to be constant during bending operation as a function of the location, and the transferred forces are set so that the surface of the glass pane simultaneously achieves the target contour in all areas of the surface that do not remain static, that is, in the regions b, c, d, e in the present case. A contribution to the bending moment is shown in FIG. 14*d*, which stems from an additional moment M z introduced by clamps or pressure strips. As is apparent in FIG. 14*a*, this is a moment that follows, and thereby supports, the bending movement of the glass pane. It makes a constant contribution and can, for example, be used to accelerate the bending process. Another contribution to the bending moment is illustrated in FIG. 14*e*. This is the moment resulting from an additional force F, wherein the additional force acts directly at the boundary of the regions d and e (so that the section e not to be deformed remains unimpaired), in that additional mass or a pressure strip is provided, for example, at this very spot. The sum of the above-described bending moments is shown in FIG. 14*f*. As becomes apparent, the bending moments act strongly in the region to which a curvature is to be imparted, while, for example, the region e located behind there is loaded less by comparison. Nonetheless, it is apparent that the bending moment, however, is not constant in the regions b, c, d, which would have to be the case to achieve the curvature shown in 14*b*. As mentioned, additionally a further available parameter is therefore set, and more particularly the viscosity. In contrast to the bending moment, the viscosity is inversely proportional to the curvature, and it is thus set in such a way that the quotient of the total moment and the viscosity assumes the desired curve that advantageously results in the target curvature. In the process, as was already described, the viscosity is anticipated by accordingly controlling the temperature in the regions b, c, and d. All parameters can be monitored and adapted during the bending process.

LIST OF REFERENCE NUMERALS 1, 1*a*-1*u* glass pane
3 pressure strip
4 support
5 target contact area
6 mount
7 starting contact area
8 movable guidance contact area
9 fixation
10 movable starting contact area
11 film
12 spacer
13 additional material
$k_a$ starting contour
$k_z$, $k_{z1}$-$k_{z3}$ intermediate contour
$k_s$, $k_{s1}$, $k_{s2}$ target contours
$r_1$-$r_3$ target radii
a-e equithermal sections of the glass pane
$s_1$-$s_3$ segment lengths
g gravity field of the Earth
F force
M bending moment

The invention claimed is:

1. A method for shaping a glass pane, the method comprising:
heating the glass pane;
one-dimensionally bending the glass pane until the glass pane has reached a shape that corresponds to a predefined target contour, wherein at least one exterior force is exerted on the glass pane to cause the one-dimensional bending of the glass pane, wherein the at least one exterior force is at least one of: a weight force caused by a weight of the glass pane, a force that is transferred by a support on which the glass pane rests to a surface region of the glass pane which rests on the support, a force that is transferred at an edge of the glass pane into the glass pane by a mount into which the edge of the glass pane is clamped, or a pressure force transferred by one or more pressure strips to a surface of the glass pane; and
changing a local curvature of the glass pane over time, wherein the changing of the local curvature is controlled such that the surface of the glass pane concurrently achieves the predefined target contour at all points of the surface that do not remain static, by:
setting a temperature, and thus a viscosity, of the glass pane during the one-dimensional bending of the glass pane so as not to be constant as a function of location, wherein a curvature is imparted to an inner section of the glass pane, the inner section of the glass pane being disposed between a first exterior section and a second exterior section, wherein no curvature is imparted to the first and second exterior sections, and the temperature is maintained below a deformation temperature in the first and second exterior sections, wherein in the inner section, a temperature of the glass pane is varied locally along a first extension direction of the glass pane as a function of location, and is set so as to be constant in a second extension direction extending orthogonally with respect to the first extension direction as a function of location, so that two or more strip-shaped regions having differing temperatures are present in the inner section, wherein the two or more strip-shaped regions in the inner section are heated towards target temperatures that spatially increase steadily from one strip-shaped region to another, a first stripped shaped region of the two or more strip-shaped regions, which is, located closest to the first exterior section, heated to a lowest target temperature among the target temperatures in the at least two strip-shaped regions, and a last strip-shaped region of the two or more strip-shaped regions, which is located closest to the second exterior section, being heated to a highest target temperature among the temperatures in the at least two strip-shaped regions.

2. The method according to claim 1, wherein at least one of: the temperature of the glass pane or a deformation of the glass pane is monitored and, based on the at least one of the temperature or the deformation of the glass pane, the temperature, and thus the viscosity, of the glass pane during the bending of the glass pane is controlled as a function of the location and/or the force transferred by the mount and/or the pressure force transferred by the one or more pressure strips are controlled, and wherein the predefined target contour is predefined by a target contact area of a bending tool, and the glass pane simultaneously makes contact with the target contact area only at the end of the bending of the glass pane.

3. The method according to claim 1, wherein the force transferred by the mount is at least one of a tensile force or a torque, and wherein the glass pane is heated using a laser.

4. The method according to claim 1, wherein a first temperature of a first section of the glass pane to which the local curvature is imparted differs from a second temperature of a second section of the glass pane to which the local curvature is imparted by at least 1 kelvin to by no more than 30 kelvin during the bending of the glass pane, and wherein the temperature of the glass pane is thermographically monitored during bending in a region to which the local curvature is imparted or in which the local curvature is changed.

5. The method according to claim 1, wherein at least one side length of the glass pane is 1.7 m or more.

6. The method according to claim 1, wherein a width of the inner section in the first extension direction being at least the same as a thickness of the glass pane or at least 3 mm or no more than 200 mm, wherein at least 3 strip-shaped regions and no more than 15 strip-shaped regions having differing temperatures are present in the inner section, wherein each of the strip-shaped regions having different temperatures in the inner section has a width, measured in the first extension direction, of at least 1.5 mm, wherein at least one of the strip-shaped regions has a width of no more than 12 mm, and wherein the predefined target contour in the inner section has a constant radius of curvature.

7. A method for producing a multiple glazed unit, the method comprising:
heating a first glass pane;
one-dimensionally bending the first glass pane until the first glass pane has reached a shape that corresponds to a predefined target contour, wherein at least one exterior force is exerted on the first glass pane to cause the one-dimensional bending of the first glass pane, wherein the at least one exterior force is at least one of: a weight force caused by a weight of the first glass pane, a force that is transferred by a support on which the first glass pane rests to a surface region of the first glass pane which rests on the support, a force that is transferred at an edge of the first glass pane into the first glass pane by a mount into which the edge of the first glass pane is clamped, or a pressure force transferred by one or more pressure strips to a surface of the first glass pane;
changing a local curvature of the first glass pane over time, wherein the changing of the local curvature is controlled such that the surface of the first glass pane concurrently achieves the predefined target contour at all points of the surface that do not remain static, by setting a temperature, and thus a viscosity, of the first glass pane during the one-dimensional bending of the first glass pane so as not to be constant as a function of location, wherein a curvature is imparted to an inner section of the first glass pane, the inner section of the glass pane being disposed between a first exterior section and a second exterior section, wherein no curvature is imparted to the first and second exterior sections, and the temperature is maintained below a deformation temperature in the first and second exterior sections, wherein, in the inner section, a temperature of the first glass pane is varied locally along a first extension direction of the first glass pane as a function of location, and is set so as to be constant in a second extension direction extending orthogonally with respect to the first extension direction as a function of location, so that two or more strip-shaped regions having differing temperatures are present in the inner section, wherein two or more strip-shaped regions in the inner section are heated toward target, temperatures that spatially increase steadily from one strip-shaped region to another strip-shaped, a first strip-shaped region of the two or more strip-shaped regions which is located closest to the first exterior section, heated to a lowest target temperature among the target temperatures in the at least two strip-shaped regions, and a last strip-shaped region of the two or more strip-shaped regions, which is located closest to the second exterior section, being heated to a highest target temperature among the temperatures in the at least two strip-shaped regions; and joining the first glass pane to a second glass pane, and wherein the second glass pane is bent in the same manner as the first glass pane.

8. The method according to claim 7 for producing a multiple glazed unit, wherein the first glass pane and the second glass pane are each bent separately, and the first glass pane and the second glass pane are thereafter disposed on top of one another in a planar manner.

9. The method according to claim 7, wherein at least one of: an insulating gap remains between the first glass pane and the second glass pane, a film is located between the first glass pane and the second glass pane, a spacer is located between the first glass pane and the second glass pane, or an additional material is located between the first glass pane and the second glass pane.

10. A multiple glazed unit, comprising:
a first glass pane and a second glass pane, wherein at least one of the first glass pane or the second glass pane is shaped by:
heating the at least one of the first glass pane or the second glass pane;
one-dimensionally bending the at least one of the first glass pane or the second glass pane until the at least one of the first glass pane or the second glass pane has reached a shape that corresponds to a predefined target contour, wherein at least one exterior force is exerted on the at least one of the first glass pane or the second glass pane to cause the one-dimensional bending of the at least one of the first glass pane or the second glass pane, wherein the at least one exterior force is at least one of: a weight force caused by a weight of the at least one of the first glass pane or the second glass pane, a force that is transferred by a support on which the at least one of the first glass pane or the second glass pane rests to a surface region of the at least one of the first glass pane or the second glass pane which rests on the support, a force that is transferred at an edge of the at least one of the first glass pane or the second glass pane into the at least one of the first glass pane or the second glass pane by a mount into which the edge of the at least one of the first glass pane or the second glass pane is clamped, or a pressure force transferred by one or more pressure strips to a surface of the at least one of the first glass pane or the second glass pane; and
changing a local curvature of the at least one of the first glass pane or the second glass pane over time, wherein the changing of the local curvature is controlled such that the surface of the at least one of the first glass pane or the second glass pane concurrently achieves the predefined target contour at all points of the surface that do not remain static, by setting a temperature, and thus a viscosity, of the at least one of the first glass pane or the second glass pane during the one-dimensional bending of the at least one of the first glass pane or the second glass pane so as not to be constant as a function of location, wherein a curvature is imparted to an inner section of the at least one of the first glass pane or the second glass pane, the inner section of the at least one of the first glass pane or the second glass pane being disposed between a first exterior section and a second exterior section, wherein no curvature is imparted to the first and second exterior sections of the at least one of the first glass pane or the second glass pane, and the temperature is maintained below a deformation temperature in the first and second exterior sections, wherein, in the inner section, a temperature of the at least one of the first glass pane or the second glass pane is varied locally along a first extension direction of the at least one of the first glass pane or the second glass pane as a function of location, and is set so as to be constant in a second extension direction extending orthogonally with respect to the first extension direction as a function of location, so that two or more strip-shaped regions having differing temperatures are present in the inner section, wherein the two or more strip-shaped regions in the inner section are heated toward target temperatures that spatially increase steadily from one strip-shaped region to another strip-shaped region, a first strip-shaped region which is located closest to the first exterior section heated to a lowest target temperature among the target temperatures in the at least two strip-shaped regions, and a last strip-shaped region of the two or more strip-shaped regions, which is located closest to the second exterior section, being heated to a highest target temperature among the temperatures in the at least two strip-shaped regions.

11. The multiple glazed unit according to claim 10, wherein the first glass pane and the second glass pane are equidistantly disposed on top of one another in a planar manner, each of the glass panes comprising at least one inner section having a radius of curvature that is smaller than the radius of curvature of adjoining sections, and the radius of curvature of the second glass pane in the inner section being smaller than the radius of curvature of the first glass pane in the inner section, the second glass pane being shaped and disposed on a concave side of the first glass pane in such a way that a gap remains between the first glass panes and the second glass pane; and wherein at least one of: a spacer or a plastic film is located in the gap.

12. The multiple glazed unit according to claim 11, wherein a smallest inner radius of curvature of the first glass pane and the second glass pane is at least 2.5 mm and no more than 300 mm, and wherein an angle between the two sections adjoining the inner section which is determined by the curvature is between 20° and 135°.

13. The multiple glazed unit according to claim 11, wherein a third glass pane, which is shaped in the same manner as the at least one of the first glass pane or the second glass pane, is equidistantly disposed on a convex side of the first glass pane in a planar manner or is equidistantly disposed on the concave side of the second glass pane in a planar manner.

* * * * *